United States Patent
Ogawa et al.

(10) Patent No.: US 7,720,584 B2
(45) Date of Patent: May 18, 2010

(54) VEHICULAR STEERING APPARATUS

(75) Inventors: Kenji Ogawa, Tokyo (JP); Takayuki Kifuku, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 367 days.

(21) Appl. No.: 11/840,664

(22) Filed: Aug. 17, 2007

(65) Prior Publication Data
US 2008/0149414 A1    Jun. 26, 2008

(30) Foreign Application Priority Data
Dec. 21, 2006    (JP) .............................. 2006-344421

(51) Int. Cl.
*A01B 69/00*    (2006.01)
(52) U.S. Cl. .............................. 701/42; 701/22; 701/36; 701/41; 180/446; 340/459
(58) Field of Classification Search .................... 701/1, 701/29, 33, 41, 45, 48, 36, 54, 114, 22; 180/268, 180/442, 444, 446; 340/459
See application file for complete search history.

(56) References Cited

U.S. PATENT DOCUMENTS

| | | | |
|---|---|---|---|
| 6,360,152 B1 * | 3/2002 | Ishibashi et al. ............... | 701/48 |
| 6,640,923 B1 * | 11/2003 | Dominke et al. ............ | 180/446 |
| 6,837,824 B2 * | 1/2005 | Reimann et al. ............ | 475/343 |
| 7,565,947 B2 * | 7/2009 | Ogawa et al. ............... | 180/444 |

FOREIGN PATENT DOCUMENTS

| | | | |
|---|---|---|---|
| JP | 10-236328 | | 9/1998 |
| JP | 11 208499 | * | 8/1999 |
| JP | 200504363 | * | 2/2005 |
| JP | 2005-088719 | | 4/2005 |

* cited by examiner

*Primary Examiner*—Gertrude Arthur Jeanglaud
(74) *Attorney, Agent, or Firm*—Sughrue Mion, PLLC

(57) ABSTRACT

In a steering apparatus for a vehicle, a target sub steering angle $\theta_{SREF}$ is set by a target-sub-steering-angle setting unit on the basis of an output $\theta_H$ of a steering-wheel-angle detection unit and a transmission characteristic $f(\theta_H)$ of a transmission-characteristic setting unit, and a target current $I_{REF}$ is set by a target-current setting unit on the basis of the target sub steering angle $\theta_{SREF}$ and an output $\theta_S$ of the sub-steering-angle detection unit. Current control unit controls a current which flows through an electric motor of a sub-steering-angle superposition mechanism, so that the target current $I_{REF}$ and a current $I_S$ of current detection unit may agree.

22 Claims, 18 Drawing Sheets

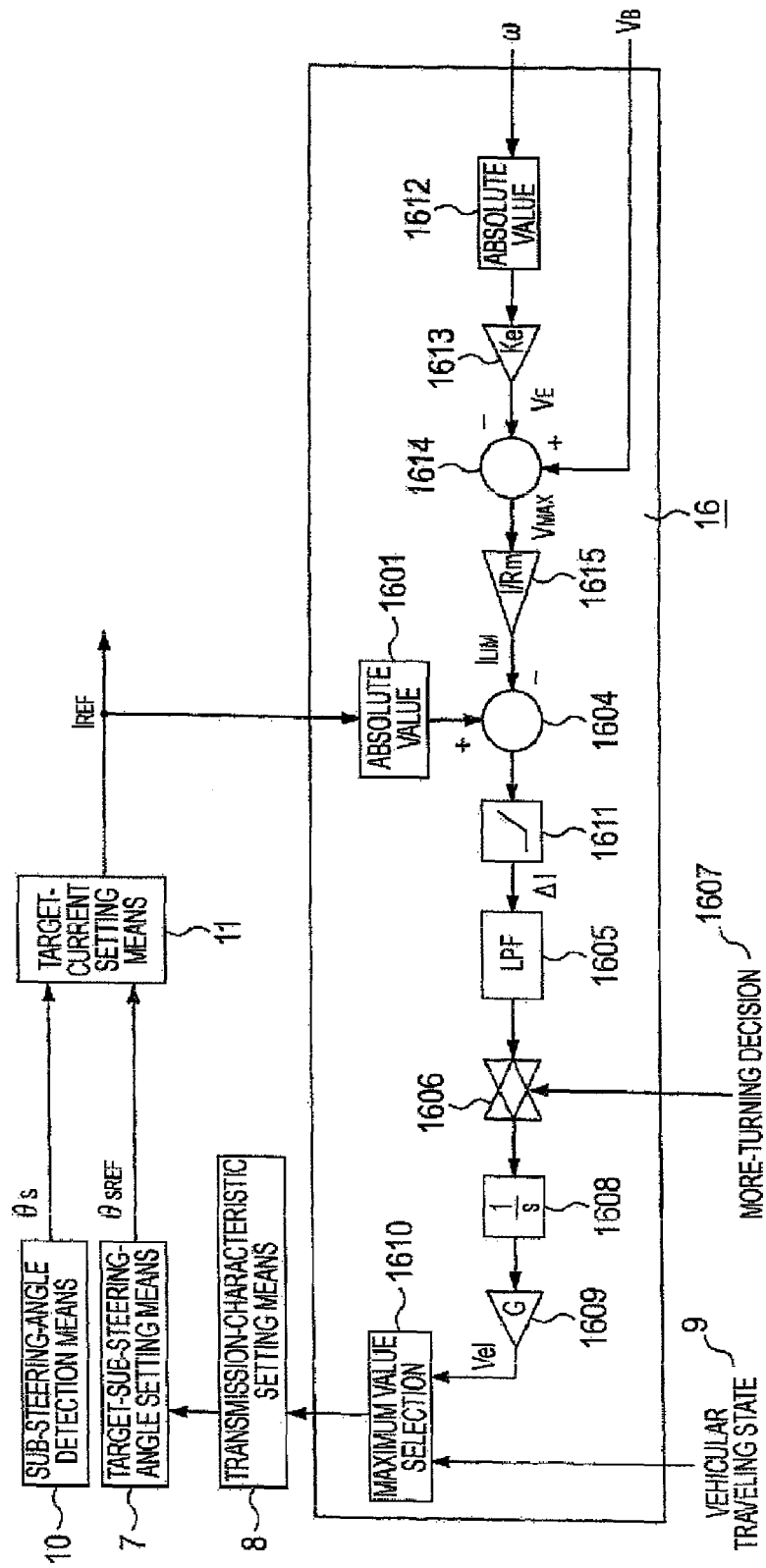

VEHICULAR STEERING APPARATUS

BACKGROUND OF THE INVENTION

1. Field of the Invention

This invention relates to a steering apparatus for a vehicle. More particularly, it relates to a vehicular steering apparatus wherein wheels are turned in such a way that a sub steering angle which is electrically controllable by a sub steering mechanism is mechanically added to the steering angle of a steering wheel manipulated by a driver.

2. Description of the Related Art

Heretofore, there have been known a large number of steering apparatuses in each of which a sub-steering-angle superposition mechanism is mounted between a steering wheel and steered wheels, and the transmission characteristic of the turning angle of the steered wheels versus the steering angle of the steering wheel manipulated by a driver is changed in accordance with the traveling state of a vehicle. (Refer to, for example, JP-A-2005-41363 which shall be termed "Patent Document 1" below.)

In the steering apparatus of Patent Document 1, it is disclosed that a PWM duty is calculated from the deviation between the target revolution angle of an electric motor for driving the sub-steering-angle superposition mechanism and a detected revolution angle, whereupon the electric motor is driven and controlled on the basis of the PWM duty.

Besides, in JP-A-11-208499 (termed "Patent Document 2" below), it is disclosed that the followup delay of the sub-steering-angle superposition mechanism is detected from the deviation between the target steered angle of the steered wheels, which has been calculated from the steering angle of the steering wheel and the transmission characteristic, and a detected steered angle, whereupon the transmission characteristic or the target steered angle is corrected so as to decrease the deviation.

In the steering apparatus of Patent Document 1, the PWM duty is calculated from the deviation between the target revolution angle of the electric motor for driving the sub-steering-angle superposition mechanism and the detected revolution angle, and the revolution angle of the electric motor is feedback-controlled. However, the PWM duty and a current which flows through the electric motor are not uniquely determined on account of an induced voltage ascribable to the revolution of the electric motor, etc. It is therefore difficult to generate by the electric motor, a torque which agrees with a necessary torque obtained from the deviation of the revolution angles. That is, there has been the problem that the setting of control constants for use in the calculation for obtaining the PWM duty from the deviation of the revolution angles is difficult.

Besides, in Patent Document 2, the followup delay of the sub-steering-angle superposition mechanism is detected from the deviation between the target steered angle and the detected steered angle, and hence, there has been the problem that the followup delay has already been involved at the stage of the detection.

SUMMARY OF THE INVENTION

This invention has been made in order to solve the problems of the prior-art apparatuses as stated above, and it has for its object to provide a vehicular steering apparatus in which the setting of the control constants of a calculational formula for obtaining a target current from an angular deviation is facilitated, and in turn, the angular control of a sub steering angle or a steered angle can be performed at a high precision.

A vehicular steering apparatus according to this invention concerns a steering apparatus for a vehicle having a steering wheel which is manipulated by a driver, and a steering mechanism which steers steered wheels by a sub-steering-angle superposition mechanism controllable by an electric motor. In one aspect of performance of this invention, the vehicular steering apparatus includes transmission-characteristic setting means for setting a transmission characteristic between a steering angle of the steering wheel and a steered angle of the steered wheels, in accordance with a traveling state of the vehicle, steering-wheel-angle detection means for detecting the steering-wheel steering angle of the driver, sub-steering-angle detection means for detecting a sub steering angle which is added by the sub-steering-angle superposition mechanism, target sub-steering-angle setting means for generating a target sub steering angle which is to be added by the sub-steering-angle superposition mechanism, on the basis of the output of the steering-wheel-angle detection means and the transmission characteristic set by the transmission-characteristic setting means, and drive control means for driving and controlling the sub-steering-angle superposition mechanism so that the target sub steering angle and the output of the sub-steering-angle detection means may agree. Here, the drive control means includes target-current setting means for setting a target drive current for the electric motor on the basis of an angular deviation between the target sub steering angle and the output of the sub-steering-angle detection means; and current control means having current detection means for detecting a current which flows through the electric motor, and for controlling the current for the electric motor so that the output of the current detection means may agree with the set current of the target-current setting means.

In another aspect of performance of this invention, the vehicular steering apparatus includes transmission-characteristic setting means for setting a transmission characteristic between a steering angle of the steering wheel and a steered angle of the steered wheels, in accordance with a traveling state of the vehicle, steering-wheel-angle detection means for detecting the steering-wheel steering angle of the driver, steered-angle detection means for detecting the steered angle of the steered wheels, and drive control means for generating a target steered angle which is to be added by the sub-steering-angle superposition mechanism, on the basis of the output of the steering-wheel-angle detection means and the transmission characteristic set by the transmission-characteristic setting means, and for driving and controlling the sub-steering-angle superposition mechanism so that the target steered angle and the output of the steered-angle detection means may agree. Here, the drive control means includes target-current setting means for setting a target drive current for the electric motor on the basis of an angular deviation between the target steered angle and the output of the steered-angle detection means; and current control means having current detection means for detecting a current which flows through the electric motor, and for controlling the current for the electric motor so that the output of the current detection means may agree with the set current of the target-current setting means.

According to the vehicular steering apparatus of this invention, the feedback control is performed by the current control means so that the target current $I_{REF}$ and the detected current $I_S$ may agree. Therefore, a disturbance such as a counter-induced voltage ascribable to the revolution of the electric motor is suppressed, and the setting of the control constants of a calculation formula for obtaining the target current from the angular deviation is facilitated. In turn, it is possible to provide the vehicular steering apparatus which can perform the angular control of the sub steering angle or the steered angle at a high precision.

The foregoing and other objects, features and advantages of this invention will become more apparent from the following detailed description of embodiments when taken in conjunction with the accompanying drawings.

BRIEF DESCRIPTION OF THE DRAWINGS

FIG. 16 is a block diagram showing the configuration of vehicular-traveling-state correction means in Embodiment 6 of this invention;

DESCRIPTION OF THE PREFERRED EMBODIMENTS

Now, embodiments of this invention will be described with reference to the drawings. Incidentally, throughout the drawings, identical numerals and signs shall indicate identical or equivalent portions.

Embodiment 1

Figure 1:
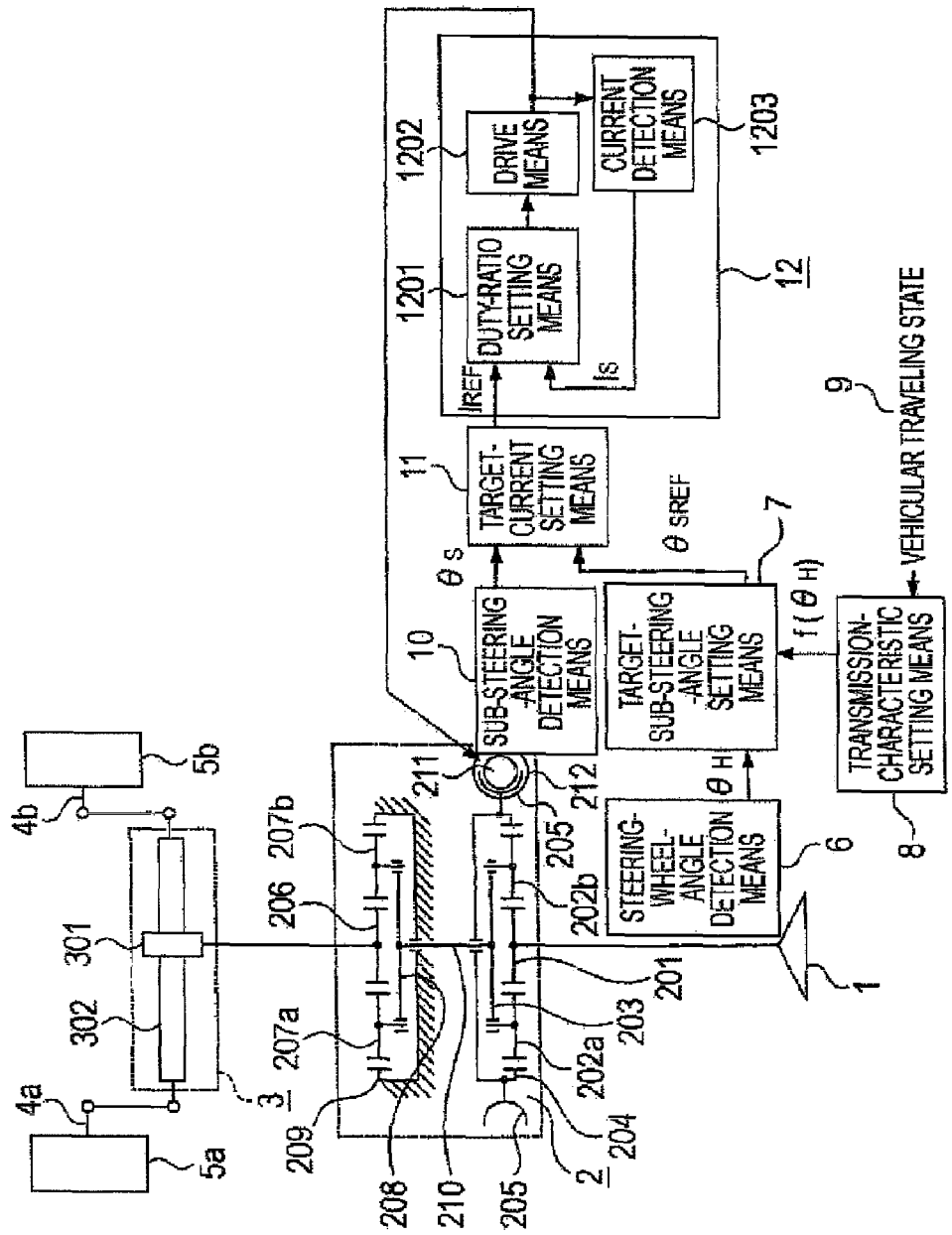
FIG. 1 is a schematic view showing the general configuration of a vehicular steering apparatus according to Embodiment 1 of this invention.

FIG. 1 is a schematic view showing the general configuration of a vehicular steering apparatus in Embodiment 1 of this invention.

Referring to FIG. 1, numeral 1 designates a steering wheel which is manipulated by the driver of a vehicle, and numeral 2 a sub-steering-angle superposition mechanism which is configured of two planetary gear mechanisms. A first planetary gear mechanism is configured of a sun gear 201 to which the steering wheel 1 is connected, planetary gears 202a and 202b which are supported by a carrier 203, a ring gear 204, and a worm wheel 205 which serves to rotate the ring gear 204. Numeral 211 indicates a worm gear, which is driven by a motor 212.

A second planetary gear mechanism is configured of a sun gear 206, planetary gears 207a and 207b which are supported by a carrier 208, and a ring gear 209 which is fixed.

Besides, the carrier 203 of the first planetary gear mechanism and the carrier 208 of the second planetary gear mechanism are coupled by a shaft 210.

Numeral 3 designates a steering mechanism of rack-and-pinion scheme, which is configured of a pinion gear 301 and a rack gear 302. Signs 4a and 4b denote knuckle arms, and signs 5a and 5b, steered wheels. The rotation of the pinion gear 301 is converted into the translation of the rack gear 302, and the translation is further converted into the steered angle of the steered wheels 5a and 5b by the knuckle arms 4a and 4b. Numeral 6 designates steering-wheel-angle detection means for detecting the steering angle of the steering wheel 1 which is manipulated by the driver, and the detection output of the means 6 is inputted to target-sub-steering-angle setting means 7. Numeral 8 designates transmission-characteristic setting means, and a vehicular traveling state 9 is inputted to the means 8. Numeral 10 designates sub-steering-angle detection means, and in Embodiment 1, this means 10 detects the revolution angle of the electric motor 212 corresponding substantially to a sub steering angle.

Numeral 11 designates target-current setting means. The output of the target-sub-steering-angle setting means 7 and that of the sub-steering-angle detection means 10 are inputted to this means 11 so as to calculate a target current for driving the electric motor 212.

Numeral 12 designates current control means. This means 12 is configured of current detection means 1203 for detecting the current flowing through the electric motor 212, duty-ratio setting means 1201 for calculating a duty ratio on the basis of the output of the target-current setting means 11 and that of the current detection means 1203, and drive means 1202 for driving the electric motor 212 on the basis of the output of the duty-ratio setting means 1201.

Next, the operation of the apparatus will be described.

Initially, there will be described a state where the worm gear 211 of the sub-steering-angle superposition mechanism 2 is not rotated. In the case where the worm gear 211 is not rotated, the ring gear 204 of the first planetary gear mechanism is fixed. In this state, when the driver manipulates the steering wheel 1 to rotate, the rotation is transmitted to the sun gear 201 of the first planetary gear mechanism. The rotation of the sun gear 201 is transmitted to the planetary gears 202a and 202b. Here, since the ring gear 204 is fixed as stated above, the rotation becomes the revolution of the carrier 203 supporting the planetary gears 202a and 202b, and the shaft 210 for transmitting rotation to the second planetary gear mechanism is rotated. That is, the first planetary gear mechanism operates as speed-down gears of planetary gear scheme.

The rotation of the shaft 210 transmits the rotation to the carrier 208 of the second planetary gear mechanism. Since the carrier 208 rotates, the planetary gears 207a and 207b revolve round the sun gear 206. In the second planetary gear mechanism, the ring gear 209 is fixed. Therefore, the revolutions of the planetary gears 207a and 207b become the rotation of the sun gear 206, and the pinion gear 301 of the steering mechanism 3 is rotated. Here, the second planetary gear mechanism operates as speed-up gears when viewed from the shaft 210. Accordingly, the rotation of the steering wheel 1 is mechanically transmitted to the pinion gear 301, and the ratio of the transmission becomes 1-to-1. (A value which is obtained by multiplying the speed-down ratio of the first planetary gear mechanism and the speed-up ratio of the second planetary gear mechanism. If the configurations of both the mechanisms are the same, the transmission ratio as a whole becomes "1".) It is accordingly understood that, when the rotation of the worm gear 211 is stopped, the mechanism of Embodiment 1 becomes an ordinary steering system in which the steering wheel angle and a pinion angle are 1-to-1.

Subsequently, there will be described a case where the steering wheel 1 is fixed and where the worm gear 211 is rotated by employing the electric motor 212.

When the worm gear 211 is rotated, the ring gear 204 is rotated through the worm wheel 205. The rotation of the ring gear 204 is transmitted to the planetary gears 202a and 202b. Since, however, the sun gear 201 is fixed by the steering wheel 1, the rotation of the ring gear 204 is transmitted as the revolutions of the planetary gears 202a and 202b, and it is transmitted to the shaft 210 through the carrier 203. When the shaft 210 is rotated, the steering mechanism 3 is driven through the second planetary gear mechanism as explained above, and the steered wheels 5a and 5b are turned.

Subsequently, there will be described a case where, while the steering wheel 1 is being manipulated, the worm gear 211 is rotated by employing the electric motor 212. Here, letting $\theta_H$ denote the steering angle of the steering wheel 1, $\theta_M$ denote the revolution angle of the electric motor 212, $\theta_P$ denote the revolution angle of the pinion gear 301, and $G_s$ denote a speed ratio from the worm gear 211 to the pinion gear 301, the following formula (1) holds, and the sub-steering-angle superposition mechanism which is electrically controllable is configured as stated above:

$$\theta_P = \theta_H + \theta_M/G_s \quad (1)$$

When $\theta_M/G_s$ is now represented as a sub steering angle $\theta_S$, Formula (1) can be reduced as the following formula (2):

$$\theta_P = \theta_H + \theta_S \quad (2)$$

Subsequently, an example of the practicable operation of Embodiment 1 will be described concerning a variable gear ratio mechanism in which the ratio between the steering angle of the steering wheel 1 and the turning angle of the steered wheels 5a and 5b is changed depending upon the traveling state 9 of the vehicle.

Figure 2A:
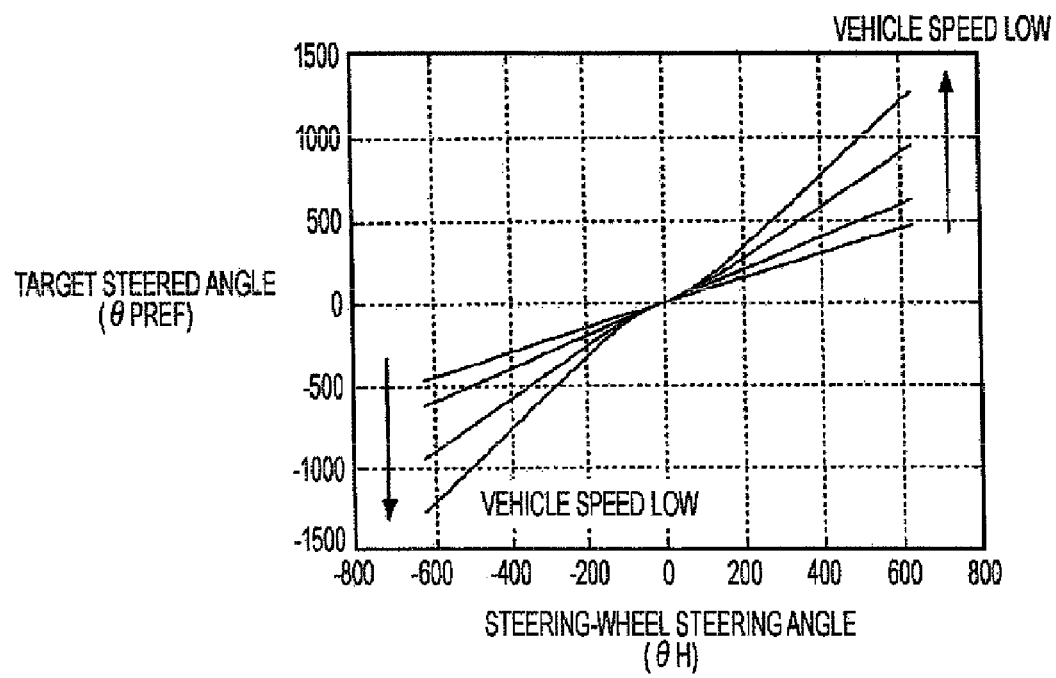
FIGS. 2A and 2B are graphs showing an example of a transmission characteristic which is used for determining a steering angle—a target turning angle in Embodiment 1 of this invention.
Figure 2B:
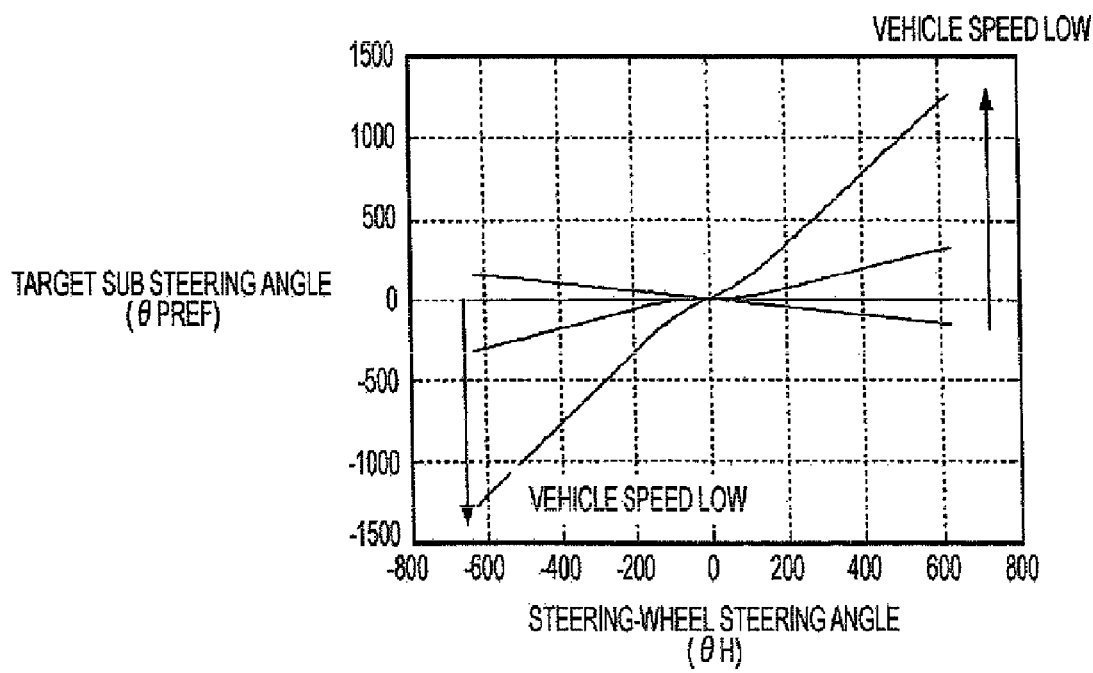

FIG. 2A shows an example of the transmission characteristic $f(\theta_H)$ of a target steered angle $\theta_{PREF}$ versus the steering angle $\theta_H$, depending upon a vehicle speed. Besides, FIG. 2B shows the results of a target sub steering angle $\theta_{SREF}$ versus the steering angle $\theta_H$, each of which has been obtained from the transmission characteristic $f(\theta_H)$ and Formula (2) representing the characteristic of the mechanism, in conformity with the following formulas (3) and (4):

$$\theta_{PREF} = \theta_H + \theta_{SREF} \quad (3)$$

$$\therefore \theta_{SREF} = \theta_{PREF} - \theta_H \quad (4)$$

Figure 3:
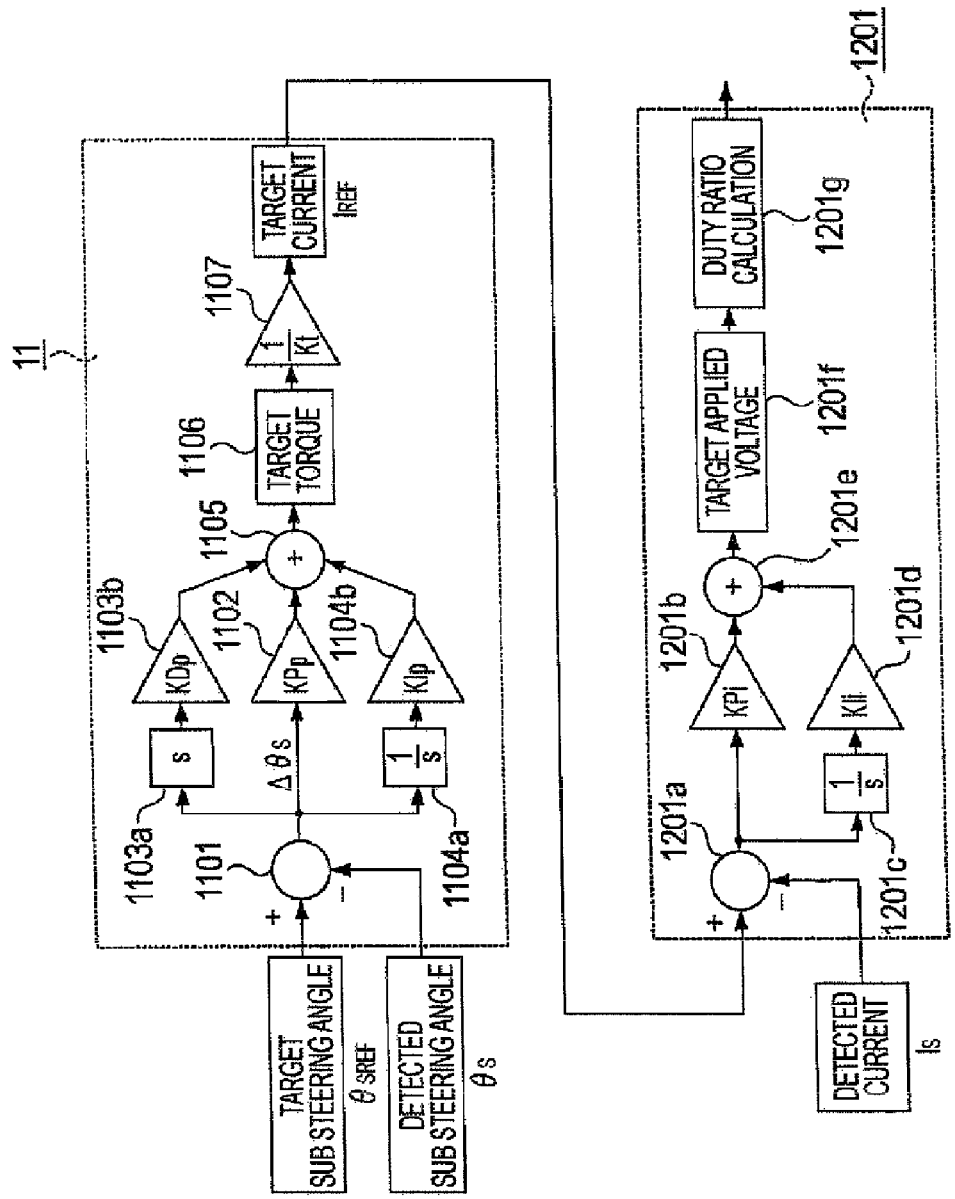
FIG. 3 is a block diagram showing an example of the configuration of target-current setting means as well as duty-ratio setting means in Embodiment 1 of this invention.

In Embodiment 1, in accordance with the vehicle speed which is one factor of the traveling state 9 of the vehicle, the transmission characteristic $f(\theta_H)$ is set by the transmission-characteristic setting means 8, and the target sub steering angle $\theta_{SREF}$ is set from the output $\theta_H$ of the steering-wheel-angle detection means 6 and the transmission characteristic $f(\theta_H)$ by the target-sub-steering-angle setting means 7. On the other hand, the sub steering angle $\theta_S$ is detected by the sub-steering-angle detection means 10, and the target sub steering angle $\theta_{SREF}$ and the detected sub steering angle $\theta_S$ are inputted to the target-current setting means 11 so as to calculate a target current $I_{REF}$. A method for calculating the target current $I_{REF}$ will be described with reference to FIG. 3. FIG. 3 is a block diagram showing an example of the configuration of the target-current setting means 11 as well as the duty-ratio setting means 1201.

First, the deviation $\Delta\theta_S$ between the target sub steering angle $\theta_{SREF}$ and the detected sub steering angle $\theta_S$ is calculated by a calculator 1101. Further, the deviation $\Delta\theta_S$ is multiplied by a proportional gain $KP_P$ by a multiplier 1102. Besides, the deviation $\Delta\theta_S$ is differentiated by a differentiator 1103a and is multiplied by a differential gain $KD_P$ by a multiplier 1103b. Further, the deviation $\Delta\theta_S$ is integrated by an integrator 1104a and is multiplied by an integral gain $KI_P$ by a multiplier 1104b. The results of the three multiplications are added up by an adder 1105, whereby a target torque $T_{REF}$ is obtained.

Incidentally, the three gains; the proportional gain $KP_P$, the differential gain $KD_P$ and the integral gain $KI_P$ are set to be the optimum, in accordance with a frequency characteristic at the time when a torque generated by the electric motor 212 is set as an input, and the sub steering angle is set as an output, in the sub-steering-angle superposition mechanism 2. Here, letting $K_t$ denote a torque constant which represents the relation of the generated torque $T_M$ to the drive current $I_M$ of the electric motor 212, the torque $T_M$ is represented as the following formula (5):

$$T_M = K_t \times I_M \quad (5)$$

Accordingly, the target torque $T_{REF}$ is converted into the target current $I_{REF}$ by a multiplier 1107 by employing the relation. Besides, the above processing is repeatedly executed every predetermined time (angular control cycle), and the target current $I_{REF}$ is sequentially updated and inputted to the current control means 12.

Next, the operation of the current control means 12 will be described.

The current control means 12 is configured of the duty-ratio setting means 1201, the drive means 1202 and the current detection means 1203.

Figure 4:
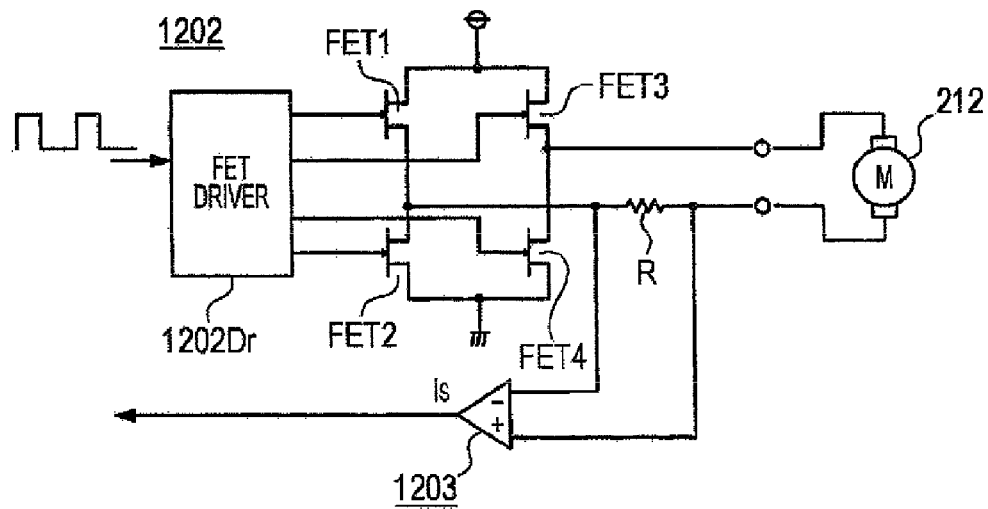
FIG. 4 is a diagram for explaining drive means and current detection means in Embodiment 1 of this invention.

First, the drive means 1202 and the current detection means 1203 will be described with reference to FIG. 4. FIG. 4 shows an example of the drive means 1202 as well as the current detection means 1203. A duty outputted from the duty-ratio setting means 1201 is inputted to a FET driver 1202Dr, which ON/OFF-controls four FETs (field-effect transistors) FET1-FET4 constituting an H bridge, in accordance with the duty, thereby to PWM-controls a voltage which is applied to the electric motor 212. Besides, a voltage which is generated across a resistance R lying on the wiring line of the electric motor 212 is detected by the differential amplifier (current detection means) 1203, whereby a current $I_s$ is detected.

The operation of the duty-ratio setting means 1201 will be described with reference to FIG. 3.

The target current $I_{REF}$ is inputted from the target-current setting means 11 to the duty-ratio setting means 1201, and the detected current $I_s$ is inputted from the current detection means 1203 thereto, whereupon the deviation between both the currents is calculated by a calculator 1201a. The deviation is multiplied by a proportional gain $KP_i$ by a multiplier 1201b, and a result obtained by integrating the deviation by an integrator 1201c is multiplied by an integral gain $KI_i$ by a multiplier 1201d. The results of the two multiplications are added up by an adder 1201e, and a target applied voltage $V_M$ for the electric motor 212 is calculated by target-applied-voltage calculation means 1201f. Duty-ratio calculation means 1201g calculates a duty ratio with which an applied voltage to the electric motor 212 becomes substantially equal to the target applied voltage $V_M$ when the electric motor 212 is driven by the drive means 1202 on the basis of the set duty ratio, by employing a driving supply voltage inputted to the drive means 1202, etc. Besides, the proportional gain $KP_i$ and the integral gain $KI_i$ are set so that a current control characteristic may become a characteristic suitable for controlling the sub steering angle, on the basis of the electrical characteristics of the electric motor 212.

The current control means 12 repeats the above steps every predetermined time (current control cycle), whereby the current to flow through the electric motor 212 is controlled in agreement with the target current $I_{REF}$ which is sequentially updated every angular control cycle by the target-current setting means 11.

Here, as stated before, the target current $I_{REF}$ outputted by the target-current setting means 11 is updated every angular control cycle. Therefore, the control of the current by the current control means 12 needs to control the current which flows through the electric motor 212 between the updating of the target current $I_{REF}$ and the next updating thereof, so as to agree with the target current $I_{REF}$. Accordingly, the current control cycle should desirably be shorter than the angular control cycle. On this occasion, the two control cycles should desirably be synchronized, but the respective controls may well proceed asynchronously.

Figure 5:
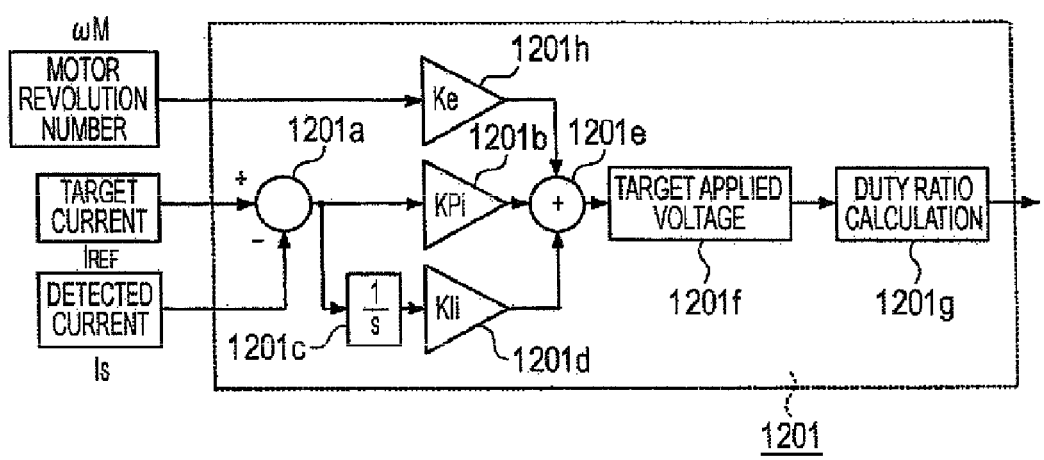
FIG. 5 is a block diagram showing a modification to the duty-ratio setting means in Embodiment 1 of this invention.

Besides, FIG. 5 shows a modification to the duty-ratio setting means 1201. The modification is such that the duty-ratio setting means 1201 shown in FIG. 3 is additionally provided with compensation means so as to set a duty ratio in consideration of an induced voltage attendant upon the revolution of the electric motor 212.

More specifically, letting Ke denote the counter-induced voltage constant of the electric motor 212, and ωM denote the revolution number thereof, a counter electromotive force $V_E$ is calculated by the following formula (6):

$$V_E = Ke \times \omega M \quad (6)$$

As shown in FIG. 5, therefore, the counter-induced voltage can be compensated in such a way that the revolution number ωM of the electric motor 212 is multiplied by the counter-induced voltage constant Ke by a multiplier 1201h, and that the result of the multiplication is added with a result calculated from the deviation between the target current $I_{REF}$ and the detected current $I_s$, by an adder 1201e. In this way, the counter-induced voltage being the maximum disturbance of a current control system as shown in FIG. 3 can be compensated by controlling the current. Therefore, the disturbance dependent upon the counter-induced voltage can be suppressed, and in turn, the current can be precisely controlled.

As described above, according to Embodiment 1 of this invention, the feedback control is performed by the current control means 12 so that the target current $I_{REF}$ and the detected current $I_s$ may agree. Therefore, the disturbances such as the counter-induced voltage ascribable to the revolution of the electric motor are suppressed, so that the control constants of the calculation formula for obtaining the target current from the angular deviation are easily set, and in turn, the sub steering angle can be precisely controlled in agreement with the target sub steering angle.

Besides, the target-current setting means 11 is configured including, at least, the proportional control means for multiplying the deviation between the target sub steering angle and the output of the sub-steering-angle detection means, by the predetermined gain, and the differential control means for multiplying the differentiated value of the deviation by the predetermined gain, so as to calculate the target drive current by the addition of the outputs of the proportional control means and the differential control means, and to drive the electric motor in agreement with the target drive current by the current control means 12. Therefore, the two gains can be set so as to optimize the responsibility of the sub steering angle of the sub-steering-angle superposition mechanism to the change of the target sub steering angle, without depending upon the characteristics of the electric motor, and the responsibility of the control can be enhanced.

Further, the target-current setting means includes in addition to the proportional control means and the differential control means, the integral control means for multiplying the integral value of the deviation between the target sub steering angle and the output of the sub-steering-angle detection means, by the predetermined gain, and it is configured so as to calculate the target drive current by the addition of the outputs of the proportional control means, differential control means and integral control means, and to drive the electric motor in agreement with the target drive current by the current control means. Thus, a controllability can be enhanced in addition to the responsibility, and the sub steering angle can be controlled more precisely.

Still further, the control cycle of the current control means for bringing the detected current into agreement with the target current is set shorter than the control cycle of the target-current setting means for calculating the target current on the basis of the target sub steering angle and the detected sub steering angle. Thus, the drive current can be caused to flow through the electric motor, without delaying from the target current, and the sub-steering-angle superposition mechanism can be precisely controlled.

Incidentally, the above description has been made by employing a two-input DC motor (with a brush) as the electric motor 212, but a three-phase DC brushless motor may well be employed. In this case, the setting of a target current and the control scheme of a current are adopted in conformity with the control scheme of the DC brushless motor.

Besides, the sub-steering-angle superposition mechanism 2 has been described as including the two planetary gear devices in combination, but any mechanism may be employed as long as it can superpose the sub steering angle on the steering of the steering wheel.

Embodiment 2

Figure 6:
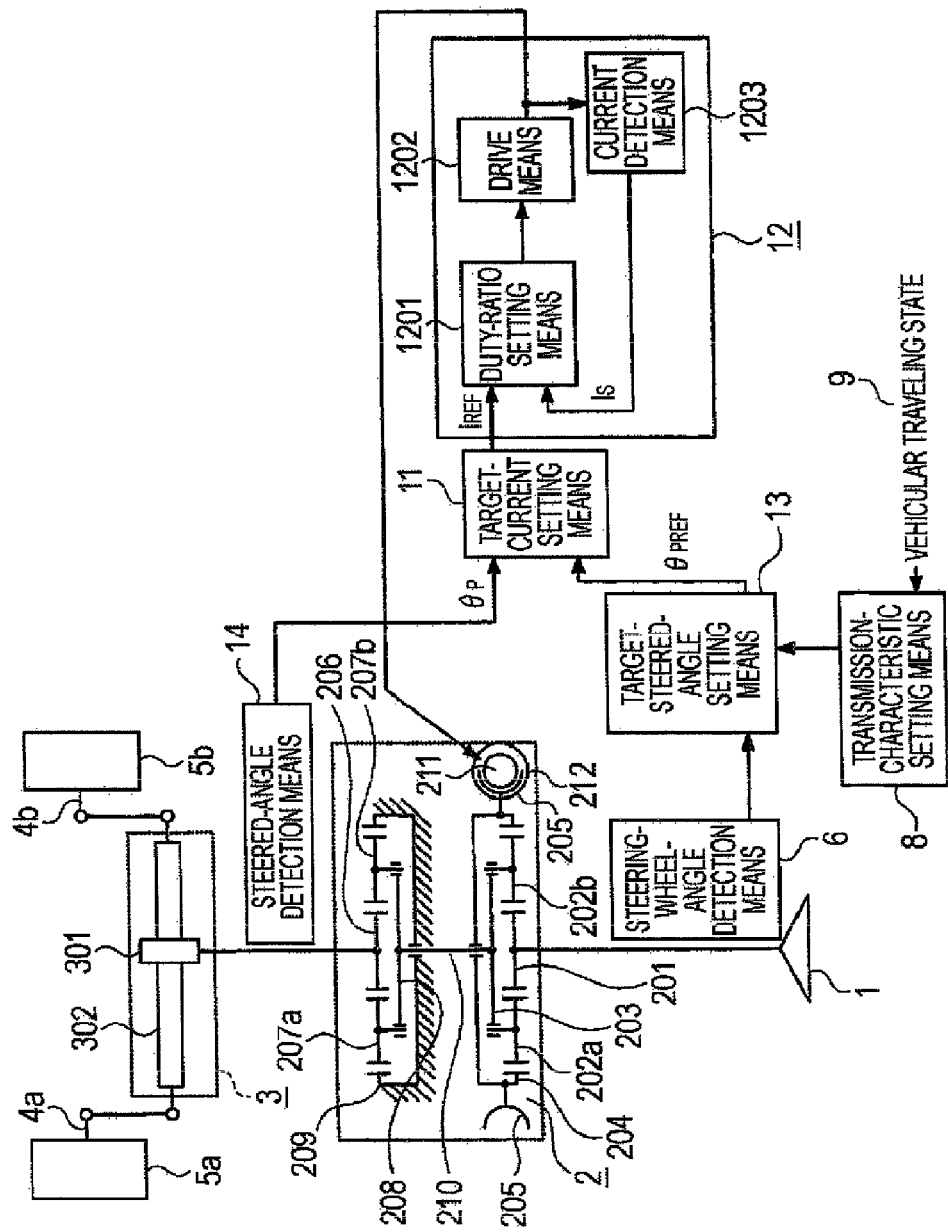
FIG. 6 is a schematic view showing the general configuration of a vehicular steering apparatus according to Embodiment 2 of this invention.

FIG. 6 is a schematic view showing the general configuration of a vehicular steering apparatus in Embodiment 2 of this invention.

The point of difference of Embodiment 2 from the foregoing Embodiment 1 is that, in Embodiment 1, the target sub steering angle is calculated from the outputs of the transmission-characteristic setting means 8 and the steering-wheel-angle detection means 6 by the target-sub-steering-angle setting means 7, whereas in Embodiment 2, target-steered-angle setting means 13 is included instead of the target-sub-steering-angle setting means 7. More specifically, as shown in FIG. 6, in the target-steered-angle setting means 13, a target steered angle $\theta_{PREF}$ is set on the basis of the output of the steering-wheel-angle detection means 6 and a transmission characteristic set by the transmission-characteristic setting means 8 as shown in FIG. 2A. Further, in Embodiment 1, a subject for the angular control is the sub steered angle, whereas in Embodiment 2, the steered angle of the wheels is a subject for the angular control, and steered-angle detection means 14 for detecting the steered angle $\theta_P$ is included. Accordingly, the target-current setting means 11 in Embodiment 2 outputs a target current $I_{REF}$ to the current control means 12 so that the target steered angle $\theta_{PREF}$ and the detected steered angle $\theta_P$ may agree. The remaining configuration and operation are the same as in Embodiment 1, and they shall be omitted from description.

Incidentally, the "steered angle" termed here may be any angle as long as it corresponds to the steered angle of the steered wheels 5a and 5b. The steered angle may well be replaced with, for example, the rotation angle of the pinion gear 301 of the rack-and-pinion mechanism 3, or the translation position of the rack 301.

In this manner, also with the configuration of Embodiment 2, the same operations and advantages as in Embodiment 1 can be attained. The setting of the control constants of the calculation formula for obtaining the target current from the angular deviation is facilitated, and the angular control of the steered angle can be performed at a high precision.

Embodiment 3

Figure 7:
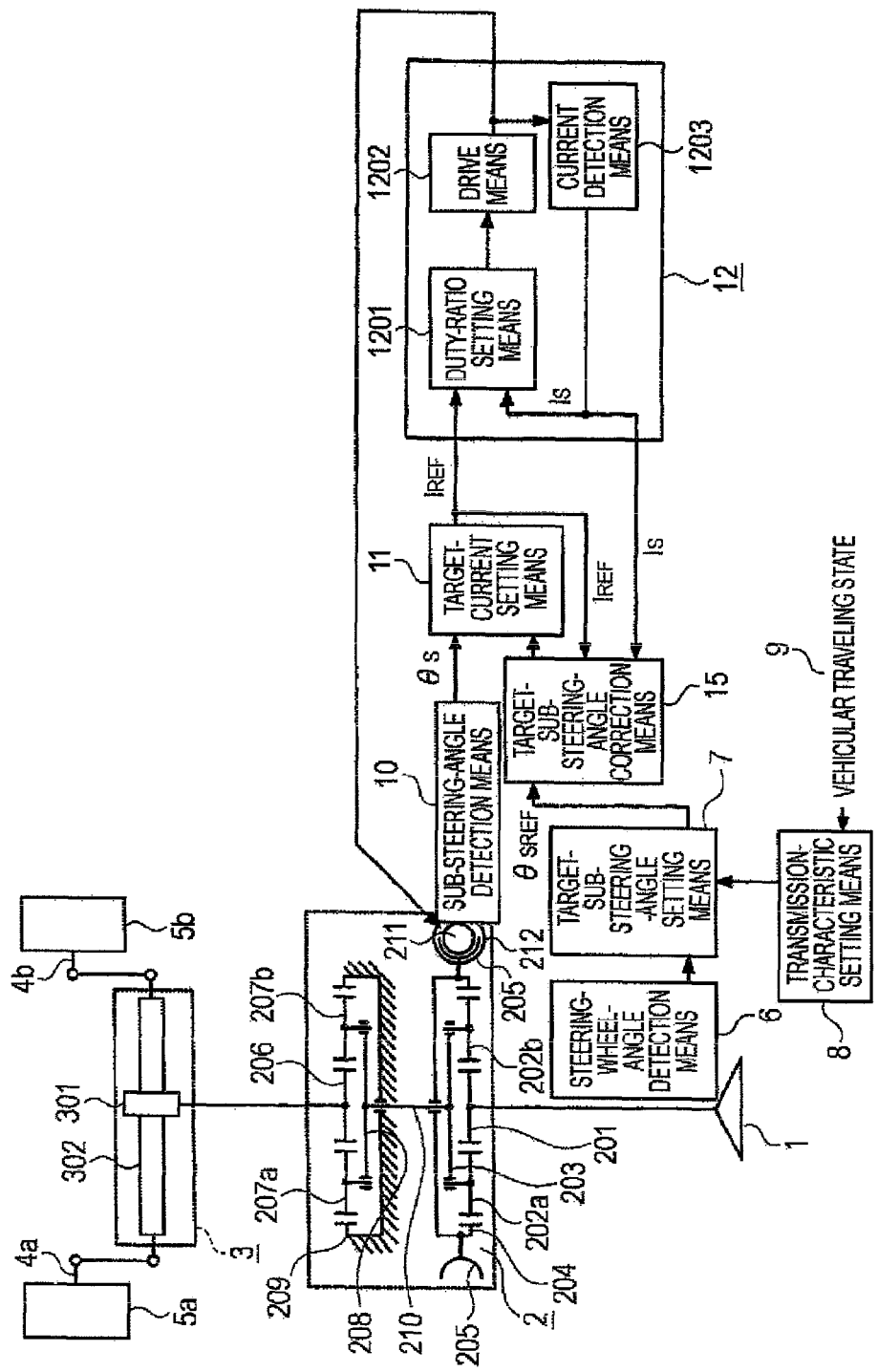
FIG. 7 is a schematic view showing the general configuration of a vehicular steering apparatus according to Embodiment 3 of this invention.

FIG. 7 is a schematic view showing the general configuration of a vehicular steering apparatus in Embodiment 3 of this invention. Embodiment 3 is such that target-sub-steering-angle correction means 15 is added in the vehicular steering apparatus of Embodiment 1 shown in FIG. 1. The target-sub-steering-angle correction means 15 receives as its inputs, a target current $I_{REF}$ from the target-current setting means 11 and a detected current $I_s$ from the current control means 12, it corrects a target sub steering angle $\theta_{SREF}$ from the target-sub-steering-angle setting means 7 on the basis of the deviation between the two currents, and it outputs a corrected target sub steering angle to the target-current setting means 11.

Now, the apparatus of Embodiment 3 will be described in detail.

As shown in FIG. 2B, as the transmission characteristic at a low vehicle speed, the motion of the sub steering angle versus the steering of the steering wheel 1 becomes large. Accordingly, when the steering wheel 1 is quickly manipulated at the low vehicle speed, also the sub steering angle must respond quickly. That is, the electric motor 212 of the sub-steering-angle superposition mechanism 2 must be revolved fast. However, even when it is intended to revolve the electric motor 212 fast, the electric motor 212 sometimes fails to be driven in agreement with the output of the target-sub-steering-angle setting means 7, on account of a counter-induced voltage attendant upon the revolution of the electric motor 212, etc. Such an example is shown in FIG. 8.

Figure 8:
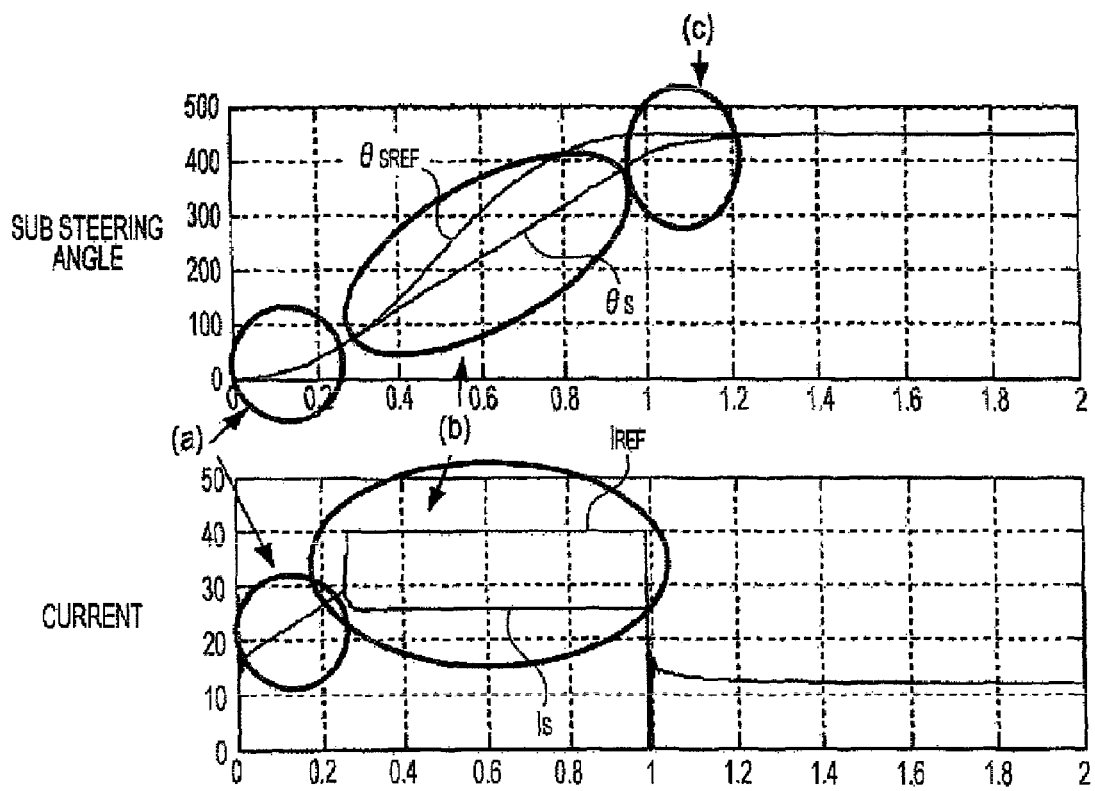
FIG. 8 is a time chart diagram showing the motion of the apparatus at the time when the change magnitude of a target sub steering angle has exceeded the capability of an electric motor, in Embodiment 3 of this invention.

FIG. 8 is a diagram showing the outlines of the target sub steering angle $\theta_{SREF}$, a detected sub steering angle $\theta_S$, a target current $I_{REF}$ and a detected current $I_s$ at the time when the steering wheel 1 has been quickly manipulated in stepped fashion.

At the beginning of the manipulation or turning (refer to (a)), the steering speed of the steering wheel 1 is low yet, and hence, the target sub steering angle $\theta_{SREF}$ and the detected sub steering angle $\theta_S$ are in agreement. Naturally, the target current $I_{REF}$ and the detected current $I_s$ are also in agreement. Further, when the steering speed becomes high, the revolution of the electric motor 212 becomes fast, and hence, the counter-induced voltage ascribable to the revolution enlarges, so that the detected current $I_s$ fails to flow in agreement with the target current $I_{REF}$. That is, a deviation occurs between the target sub steering angle $\theta_{SREF}$ and the detected sub steering angle $\theta_s$ (refer to (b)). When the deviation has occurred, the target current $I_{REF}$ is outputted with the maximum current as a target, on account of the deviation. At the end of the turning or manipulation (refer to (c)), the deviation is involved between the target sub steering angle $\theta_{SREF}$ and the detected sub steering angle $\theta_s$, and hence, the drive of the electric motor 212 is continued. The rotation of the sub steering angle is continued in spite of the end of the manipulation, and this becomes an uneasy feeling to the driver. The apparatus of Embodiment 3 eliminates the uneasy feeling.

Subsequently, the operation of Embodiment 3 will be described with reference to FIGS. 9A and 9B.

Figure 9A:
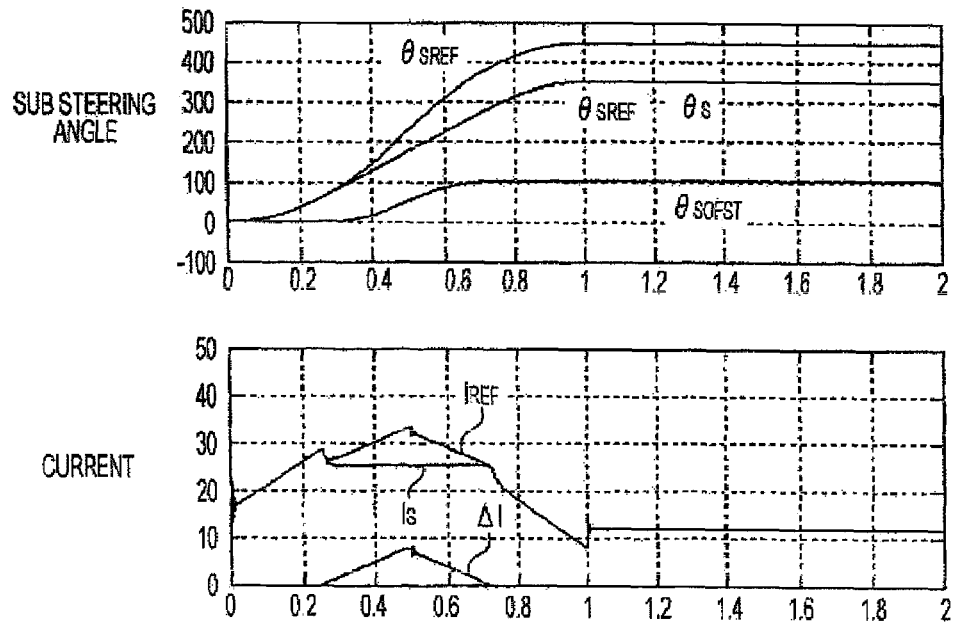
FIGS. 9A and 9B are diagrams for explaining a method for correcting a target sub steering angle on the basis of a current deviation, in Embodiment 3 of this invention.
Figure 9B:
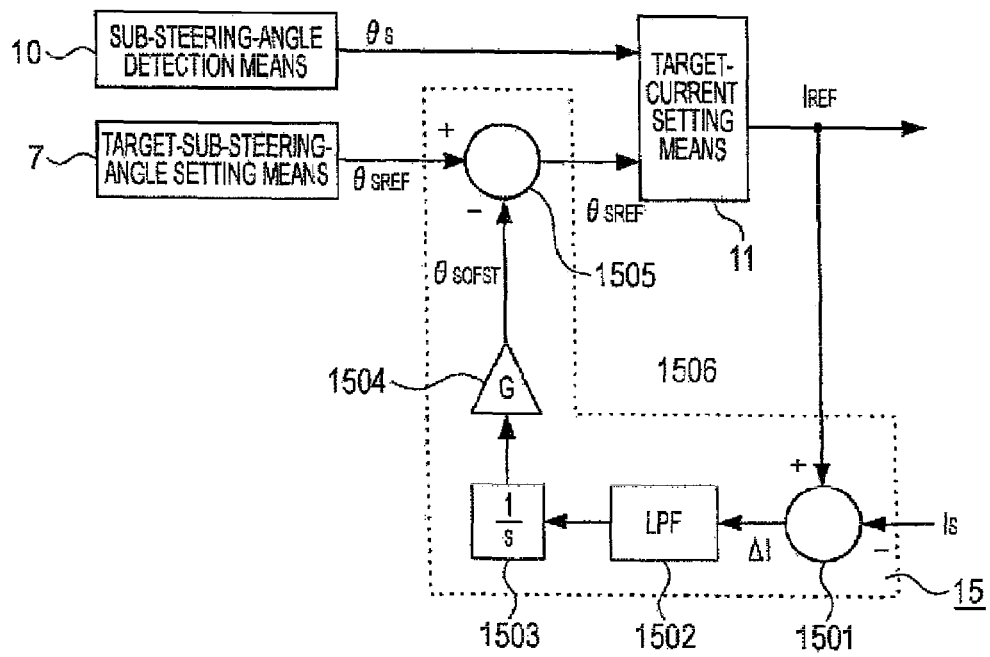

FIG. 9B is a block diagram showing an example of the configuration of the target-sub-steering-angle correction means 15. Referring to FIG. 9B, the target current $I_{REF}$ and the detected current $I_s$ are inputted to the target-sub-steering-angle correction means 15, and a current deviation $\Delta I$ is calculated by a calculator 1501. Further, the current deviation $\Delta I$ is passed through an LPF (low-pass filter) 1502 for noise elimination, which has a time constant being, at least, equal to the steering frequency of the driver, and it is thereafter integrated by an integrator 1503. The result of the integration is multiplied by a predetermined gain G by a multiplier 1504, whereby a target-sub-steering-angle correction magnitude $\theta_{SOFST}$ is calculated.

Further, the target-sub-steering-angle correction magnitude $\theta_{SOFST}$ is subtracted from the target sub steering angle $\theta_{SREF}$ by a calculator 1505, and a corrected target sub steering angle $\theta_{SREF'}$ is obtained.

The corrected target sub steering angle $\theta_{SREF'}$ is inputted to the target-current setting means 11, and a new target current $I_{REF}$ is set on the basis of this angle $\theta_{SREF'}$ and the detected sub steering angle $\theta_s$ from the sub-steering-angle detection means 10.

That is, owing to the feedback of the current deviation $\Delta I$, the target current $I_{REF}$ is corrected so as to decrease the current deviation $\Delta I$.

Owing to such processing, the sub-steering-angle superposition mechanism 2 is controlled so that the corrected target sub steering angle $\theta_{SREF'}$ and the detected sub steering angle $\theta_s$ may agree as shown in FIG. 9A. The correction magnitude $\theta_{SOFST}$ changes only when the steering speed is too high for the followup of the control of the sub steering angle, and this correction magnitude $\theta_{SOFST}$ becomes unchangeable when the steering speed becomes low as the end of the turning or manipulation comes near.

Consequently, as the end of the turning or manipulation comes near, the motion of the sub steering angle relative to the manipulation of the steering wheel becomes as usual, and hence, the uneasy feeling to the driver is suppressed. However, the neutral point of the steering wheel shifts in correspondence with the correction magnitude $\theta_{SOFST}$. Therefore, the correction magnitude $\theta_{SOFST}$ is changed toward zero gradually so as not to offend the driver, since the current deviation $\Delta I$ has become zero or after a predetermined time has lapsed.

Incidentally, the above description has been made concerning the case of correcting the target sub steering angle, but the detected sub steering angle or the steering wheel angle may well be corrected. Besides, the current deviation $\Delta I$ has been directly integrated, but in the integration, a dead zone may well be provided and integrated by estimating a current deviation which occurs in a normal current control. Besides, the above description has mentioned the application to the method for controlling the sub steering angle as explained in Embodiment 1, but Embodiment 3 may well be applied to the method for controlling the steered angle as explained in Embodiment 2. In this case, it is allowed to replace the target sub steering angle with the target steered angle, and the detected sub steering angle with the detected steered angle.

As described above, according to the vehicular steering apparatus of Embodiment 3, the drive control state of the electric motor is detected on the basis of the deviation between the target drive current and the output of the current detection means, and the target sub steering angle is corrected on the basis of the control state. Therefore, the sub steering angle can be controlled without enlarging the deviation between the target sub steering angle and the sub steering angle detected by the sub-steering-angle detection means. It is accordingly preventable that, in spite of the end of the turning or manipulation of the steering wheel, the drive of the electric motor 212 is continued, so the rotation of the sub steering angle is continued to give the driver the uneasy feeling.

Embodiment 4

Figure 10:
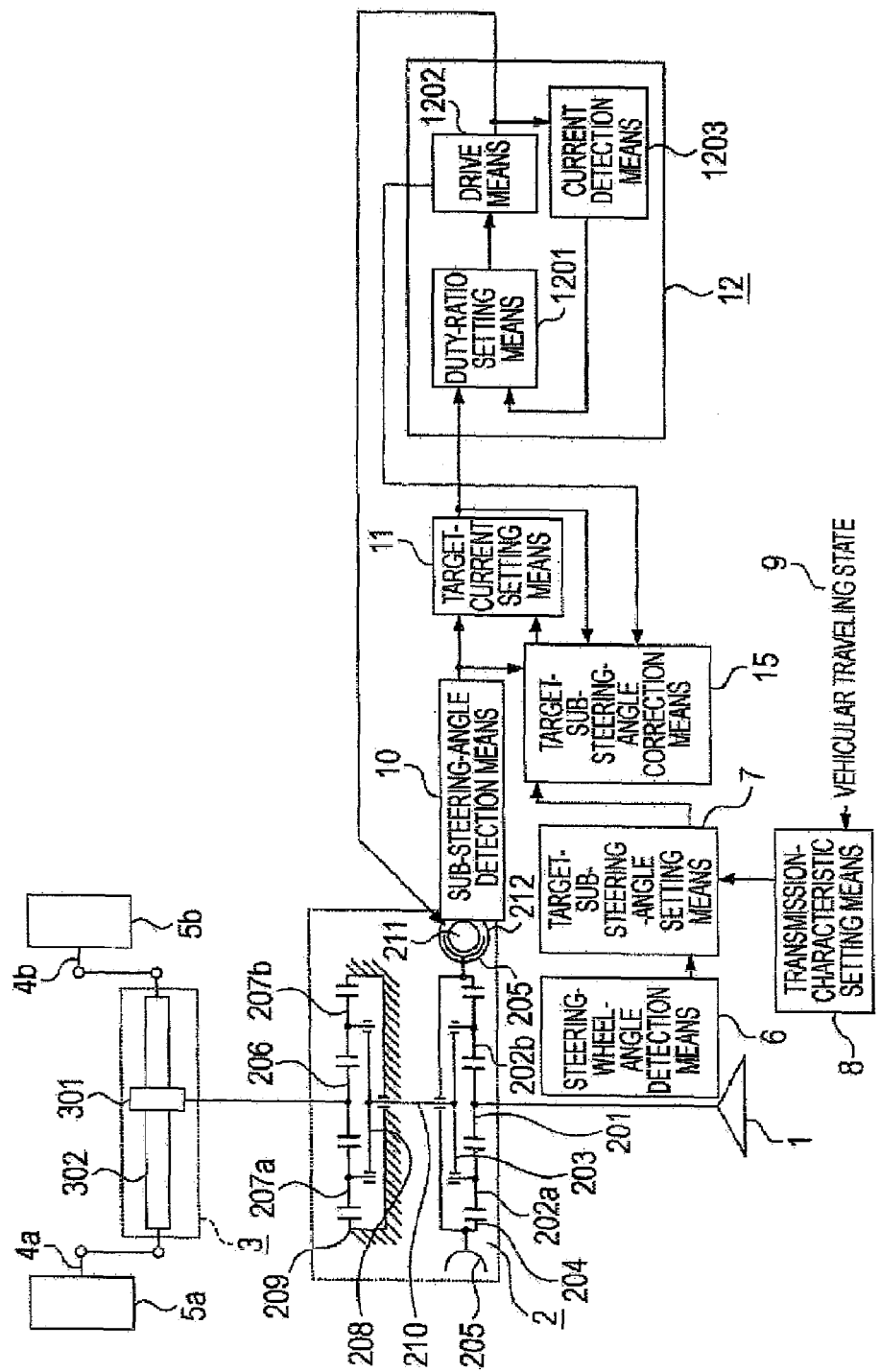
FIG. 10 is a schematic view showing the general configuration of a vehicular steering apparatus according to Embodiment 4 of this invention.

FIG. 10 is a schematic view showing the general configuration of a vehicular steering apparatus in Embodiment 4 of this invention. Embodiment 4 has the configuration of the sub-steering-angle correction means 15 modified in comparison with Embodiment 3, and the purpose thereof is the same as that of Embodiment 3.

Now, the apparatus of Embodiment 4 will be described with reference to FIGS. 11A and 11B.

Figure 11A:
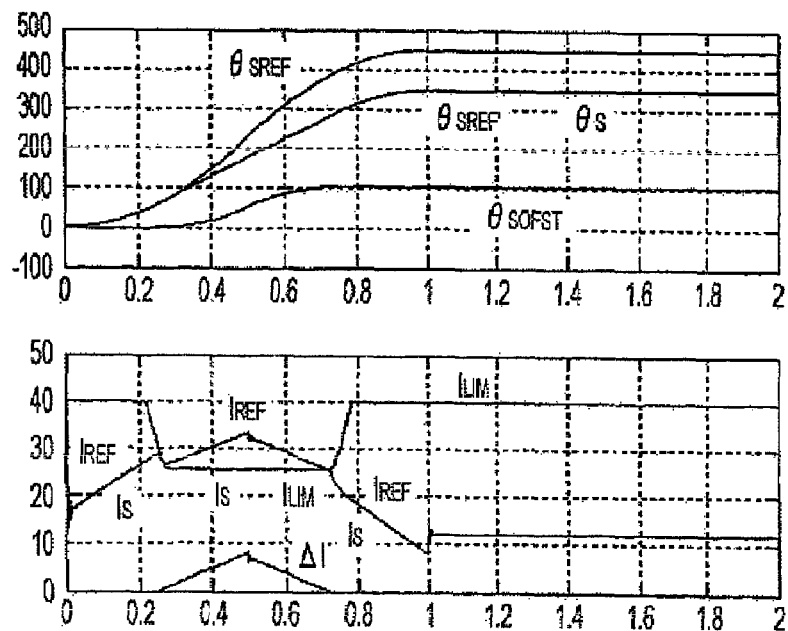
FIGS. 11A and 11B are diagrams for explaining a method for correcting a target sub steering angle on the basis of an induced voltage and a target current, in Embodiment 4 of this invention.
Figure 11B:
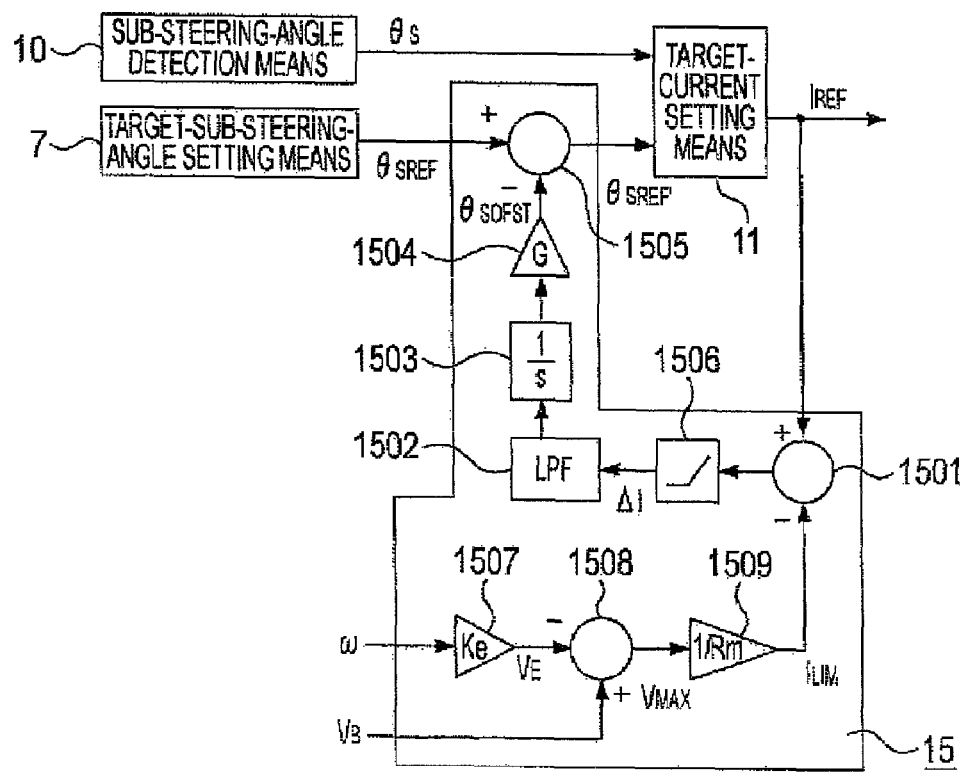

FIG. 11B is a block diagram showing the configuration of the target-sub-steering-angle correction means 15. Referring to the figure, the angular velocity $\omega$ of the electric motor 212, the maximum applied voltage $V_B$ which can be applied to the electric motor 212, and a target current $I_{REF}$ are inputted to the target-sub-steering-angle correction means 15. First, the angular velocity $\omega$ is multiplied by the counter-induced voltage constant Ke of the electric motor 212 by a multiplier 1507, thereby to calculate a counter-induced voltage $V_E$ which the electric motor 212 is generating. Subsequently, the difference of the voltage $V_E$ from the maximum applied voltage $V_B$ is calculated as a voltage $V_{MAX}$.

Letting Rm denote the total resistance of a current path, which includes the internal resistance of the drive means 1202 and the internal resistance and wiring resistance of the electric motor 212, the voltage $V_{MAX}$ is divided by the resistance Rm by a divider 1509, thereby to calculate the maximum current $I_{LIM}$ which can be caused to flow through the electric motor 212.

That is, a current cannot be caused to flow through the electric motor 212 in excess of the current $I_{LIM}$ calculated here.

Subsequently, the difference between the target current $I_{REF}$ and the maximum current $I_{LIM}$ is calculated by a calculator 1501. Here, when the result of the calculation of the difference is minus, it is meant that the current can be caused to flow through the electric motor 212 in agreement with the target current $I_{REF}$ by the current control means 12. On the other hand, when the result is plus, the current cannot be caused to flow through the electric motor 212 in agreement with the target current $I_{REF}$ by the current control means 12, and the drive control of the sub-steering-angle superposition mechanism 2 cannot be performed in agreement with the target sub steering angle $\theta_{SREF}$.

Numeral 1506 designates clip means, and this means 1506 clips the lower limit of the difference between the target current $I_{REF}$ and the maximum current $I_{LIM}$ to zero, thereby to derive a current component which cannot be caused to flow through the electric motor 212.

The output of the clip means 1506 becomes equivalent to the difference between the target current $I_{REF}$ and the detected current $I_s$ in Embodiment 3, and the subsequent processing is equivalent to the operation of the apparatus of Embodiment 3.

More specifically, the output of the clip means 1506 is set as the current deviation $\Delta I$. The current deviation $\Delta I$ is passed through the LPF 1502 for noise elimination, which has a time constant being, at least, equal to the steering frequency of the driver, and it is thereafter integrated by the integrator 1503. The result of the integration is multiplied by a predetermined gain G by the multiplier 1504, whereby a target-sub-steering-angle correction magnitude $\theta_{SOFST}$ is calculated. Further, the target-sub-steering-angle correction magnitude $\theta_{SOFST}$ is subtracted from the target sub steering angle $\theta_{SREF}$ by the calculator 1505, and a corrected target sub steering angle $\theta_{SREF'}$ is obtained.

The corrected target sub steering angle $\theta_{SREF'}$ is inputted to the target-current setting means 11, and a new target current $I_{REF}$ is set on the basis of this angle $\theta_{SREF'}$ and the detected sub steering angle $\theta_s$ from the sub-steering-angle detection means 10.

That is, owing to the feedback of the current deviation $\Delta I$, the target current $I_{REF}$ is corrected so as to decrease the current deviation $\Delta I$.

Owing to such processing, the sub-steering-angle superposition mechanism 2 is controlled so that the corrected target sub steering angle $\theta_{SREF'}$ and the detected sub steering angle $\theta_s$ may agree as shown in FIG. 11A. The correction magnitude $\theta_{SOFST}$ changes only when the steering speed is too high for the followup of the control of the sub steering angle, and this correction magnitude $\theta_{SOFST}$ becomes unchangeable when the steering speed becomes low as the end of the turning or manipulation comes near. Consequently, as the end of the turning or manipulation comes near, the motion of the sub steering angle relative to the manipulation of the steering wheel becomes as usual, and hence, the uneasy feeling to the driver is suppressed.

However, the neutral point of the steering wheel shifts in correspondence with the correction magnitude $\theta_{SOFST}$. Therefore, the correction magnitude $\theta_{SOFST}$ is changed toward zero gradually so as not to offend the driver, since the current deviation $\Delta I$ has become zero or after a predetermined time has lapsed.

Incidentally, the above description has been made concerning the case of correcting the target sub steering angle, but the detected sub steering angle or the steering wheel angle may well be corrected. Besides, the current deviation ΔI has been directly integrated, but in the integration, a dead zone may well be provided and integrated by estimating a current deviation which occurs in a normal current control. Besides, the above description has mentioned the application to the method for controlling the sub steering angle as explained in Embodiment 1, but Embodiment 4 may well be applied to the method for controlling the steered angle as explained in Embodiment 2. In this case, it is allowed to replace the target sub steering angle with the target steered angle, and the detected sub steering angle with the detected steered angle.

As described above, according to the vehicular steering apparatus of Embodiment 4, there are included the means for detecting the revolution speed of the electric motor, and the means for detecting the maximum applied voltage for the electric motor, and the current range which can be caused to flow through the electric motor is calculated using the revolution number of the electric motor and the maximum applied voltage, whereupon the target sub steering angle is corrected so that the target current based on the target-current setting means may fall within the current range. Therefore, the sub steering angle can be controlled without enlarging the deviation between the target sub steering angle and the sub steering angle detected by the sub-steering-angle detection means.

Embodiment 5

Figure 12:
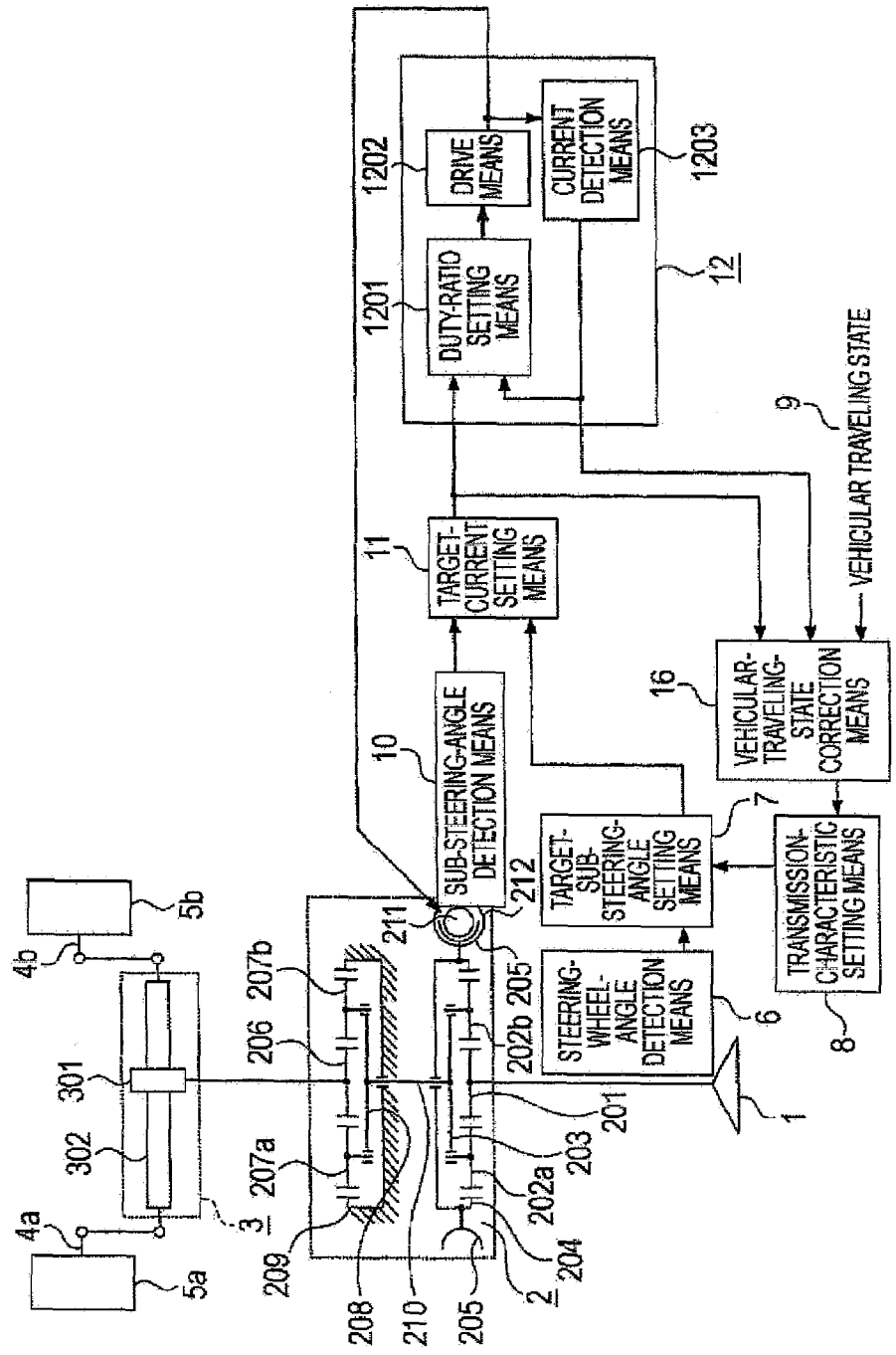
FIG. 12 is a schematic view showing the general configuration of a vehicular steering apparatus according to Embodiment 5 of this invention.

FIG. 12 is a schematic view showing the general configuration of a vehicular steering apparatus in Embodiment 5 of this invention. As compared with Embodiment 3 or Embodiment 4, Embodiment 5 includes vehicular-traveling-state correction means 16 instead of the target-sub-steering-angle correction means 15.

Now, the apparatus of Embodiment 5 will be described with reference to FIG. 13 and FIGS. 14A and 14B.

Figure 13:
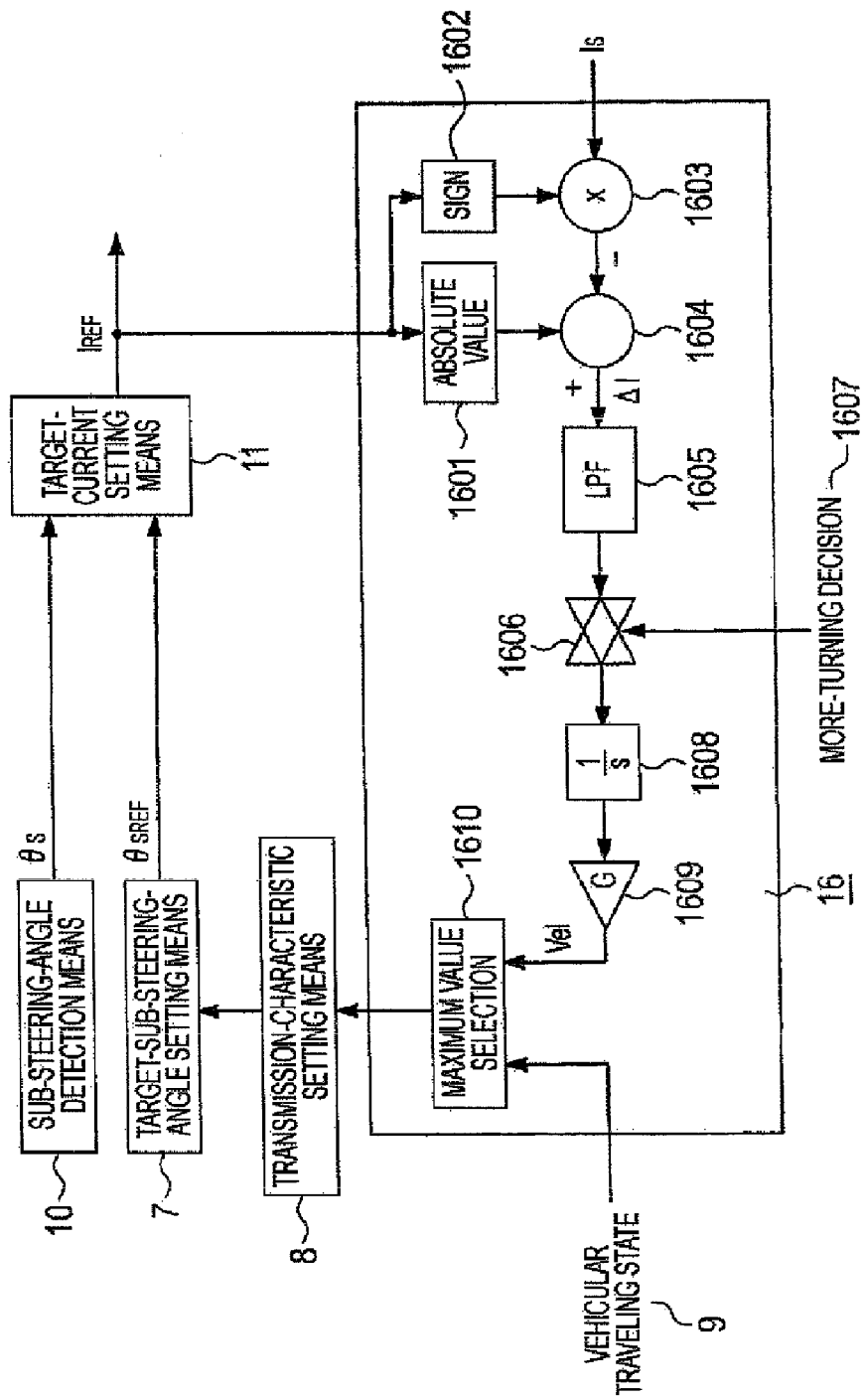
FIG. 13 is a block diagram showing the configuration of vehicular-traveling-state correction means in Embodiment 5 of this invention.

FIG. 13 is a block diagram showing the configuration of the vehicular-traveling-state correction means 16. Referring to FIG. 13, the absolute value of a target current $I_{REF}$ outputted from the target-current setting means 11 is first calculated in absolute-value calculation means 1601. Besides, the polarity of the target current is detected by detection means 1602, and the sign of a detected current $I_s$ is regulated by sign regulation means 1603. More specifically, in a case where the target current $I_{REF}$ is plus, the detected current $I_s$ is directly outputted from the sign regulation means 1603, and in a case where the target current $I_{REF}$ is minus, the detected current $I_s$ has its sign inverted by the sign regulation means 1603 and is outputted. Owing to this processing, the subsequent processing can be executed without regard to the revolution direction of the electric motor 212.

The absolute value of the target current $I_{REF}$ and the detected current $I_s$ whose sign has been adjusted have their difference calculated by a calculator 1604, whereby a current deviation ΔI is obtained. Here, when the current deviation ΔI≈0 holds, it is meant that the current control based on the current control means 12 is established. When the current deviation ΔI>0 holds, it is meant that a current is not caused to flow through the electric motor 212 in agreement with the target current, on account of a counter-induced voltage ascribable to the revolution of the electric motor 212, etc. If the control is continued as it is, a large deviation will occur between a target sub steering angle and the actual sub steering angle of the sub-steering-angle superposition mechanism 2. Therefore, the current deviation ΔI is passed through an LPF 1605 for noise elimination, which has a time constant being, at least, equal to the steering frequency of the driver, and it is thereafter inputted to a gate 1606. Only when more-turning decision means 1607 decides more turning, the gate 1606 passes the output of the LPF 1605, and the output of the LPF 1605 is inputted to and integrated by an integrator 1608.

Although the decision of the more turning is not shown in the figure, the output of the steering-wheel-angle detection means 6 is utilized, and a more-turning direction is decided when a steering wheel angle indicates right steering, and besides, a steering-wheel steering speed is in a rightward direction, or when the steering wheel angle indicates left steering, and besides, the steering-wheel steering speed is in a leftward direction. Alternatively, the decision may well be rendered by executing equivalent processing with the output of the sub-steering-angle detection means 10.

The result of the integration is multiplied by a predetermined gain G by a multiplier 1609, thereby to calculate corrected vehicular traveling state Vel. Here, the vehicular traveling state is set as a vehicle speed.

In maximum-value selection means 1610, the corrected vehicular traveling state Vel calculated above is compared with the vehicular traveling state 9, and the state of larger value is outputted to the transmission-characteristic setting means 8. In the transmission-characteristic setting means 8, a transmission characteristic is set in accordance with the inputted vehicular traveling state.

Here, the characteristic of the transmission-characteristic setting means 8 will be described again.

FIGS. 2A and 2B show the example of the transmission characteristic based on the transmission-characteristic setting means 8. As shown in the figures, as the vehicle speed heightens, the sub steering angle for the same steering wheel angle narrows. That is, it is meant that, when the transmission characteristic is altered onto the side of higher vehicle speed while the steering wheel is being more turned, a sub steering angle speed is suppressed.

Further, the operation of Embodiment 5 will be described with reference to FIGS. 14A and 14B.

Figure 14A:
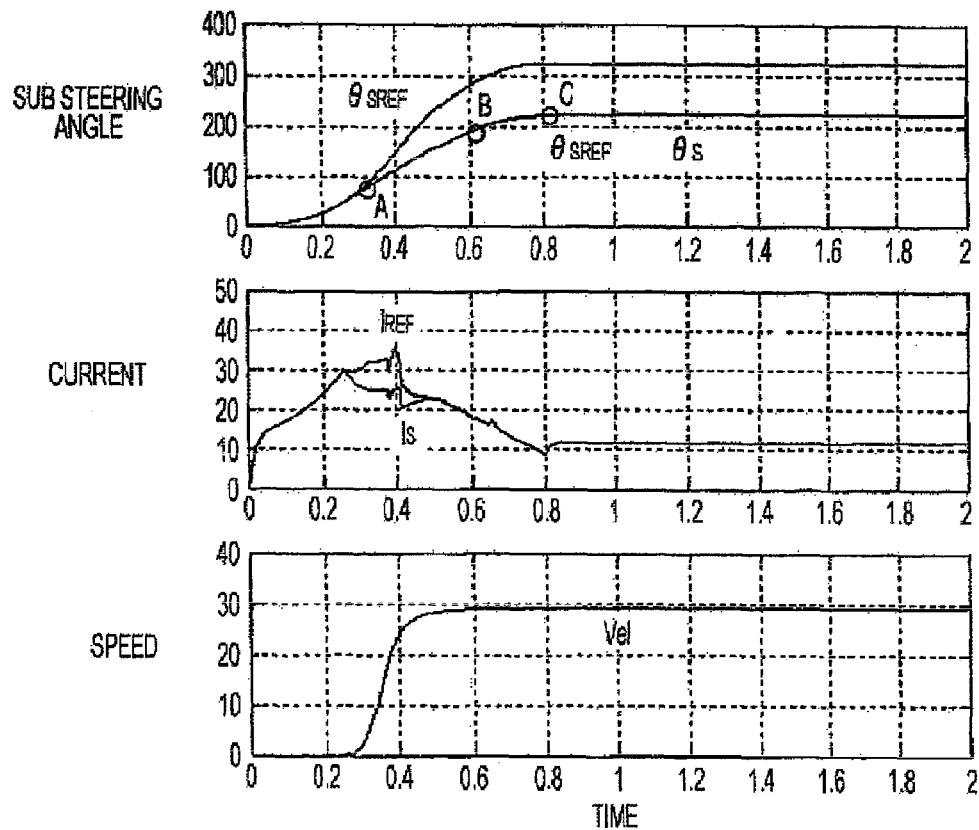
FIGS. 14A and 14B are diagrams for explaining a method for correcting a vehicular traveling state which is used in the setting of a target sub steering angle in Embodiment 5 of this invention.

In FIG. 14A, a target sub steering angle $\theta_{SREF}$ shows a state where Embodiment 5 is not applied, that is, where the vehicular traveling state is not corrected. On the other hand, a target sub steering angle $\theta_{SREF'}$ shows a state where the vehicular-traveling-state correction means 16 in Embodiment 5 is applied.

More specifically, the target sub steering angle $\theta_{SREF'}$ is a result obtained from the transmission characteristic, which has been obtained by inputting the vehicular state correction value Vel calculated from the current deviation ΔI between the target current $I_{REF}$ and the detected current $I_s$ to the transmission-characteristic setting means 8 as shown in FIG. 13, as the vehicular traveling state (speed), and the steering wheel angle by the target-sub-steering-angle setting means 7.

It is understood that, when the current deviation ΔI between the target current $I_{REF}$ and the detected current $I_s$ occurs, the vehicular state correction value Vel enlarges, with the result that the target sub steering angle $\theta_{SREF'}$ is set lower than in the case where the vehicular-traveling-state correction means 16 is not applied. Besides, the sub-steering-angle detection value $\theta_S$ follows up the target sub steering angle $\theta_{SREF'}$.

Figure 14B:
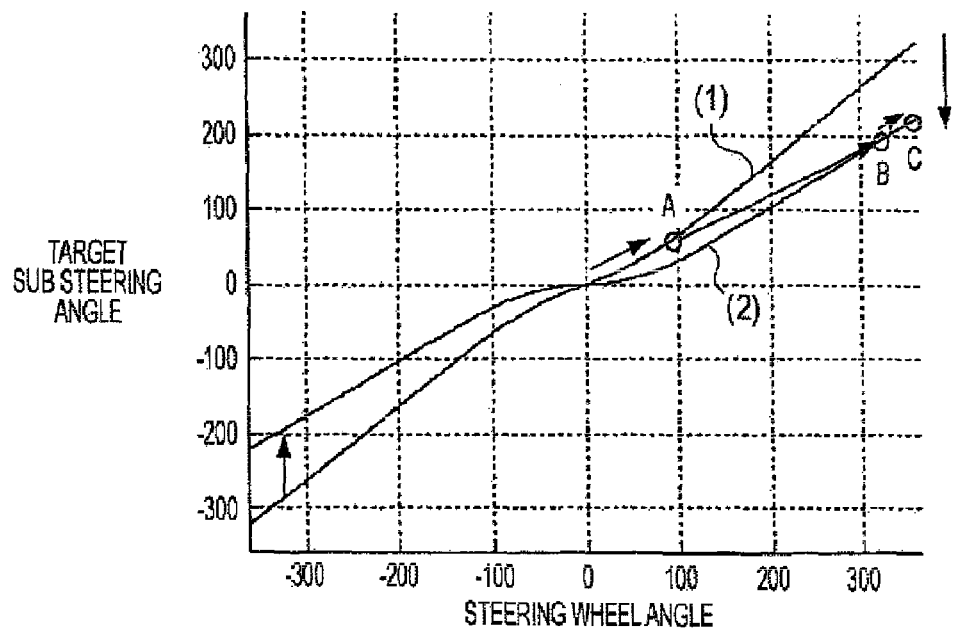

FIG. 14B is a diagram showing the change of a transmission characteristic set by inputting the vehicular state correction value Vel to the transmission-characteristic setting means 8, and the target sub steering angle $\theta_{SREF'}$ set by the target-sub-steering-angle setting means 7. In FIG. 14B, up to a point A, the target sub steering angle $\theta_{SREF'}$ changes in conformity with the motion of the steering wheel angle on an initial transmission characteristic (1). With the change of the vehicular state correction value Vel, the target sub steering angle $\theta_{SREF'}$ changes in conformity with the motion of the steering wheel angle while the transmission characteristic is changing in a direction from (1) to (2). The transmission characteristic becomes the characteristic (2) from a point B at which the vehicular state correction value Vel becomes unchangeable, and the target sub steering angle $\theta_{SREF'}$ changes on the transmission characteristic (2) in conformity with the motion of the steering wheel angle, up to a point C which is the end point of the steering.

Subsequently, when the steering wheel is returned to its middle point, the target sub steering angle $\theta_{SREF'}$ returns to its neutral point because the transmission characteristic is (2).

Since the current deviation $\Delta I$ has become zero or after a predetermined time has lapsed, the integral magnitude of the integrator 1608 is changed so that the value of the vehicular state correction value Vel may become zero gradually so as not to offend the driver. Further, when the vehicular traveling state 9 becomes larger than the vehicular traveling state correction magnitude Vel, the vehicular traveling state 9 is inputted to the traveling-characteristic setting means 8 by the maximum-value selection means 1610, and the ordinary state is established. At this time, the integral magnitude of the integrator 1608 is reset to zero.

By the way, in the above description, the current deviation $\Delta I$ has been directly integrated, but in the integration, a dead zone may well be provided and integrated by estimating a current deviation which occurs in a normal current control. Alternatively, the current deviation $\Delta I$ may well be integrated only when the target current is, at least, equal to a predetermined current, so as to execute the integration only under the state where the current cannot be caused to flow in agreement with the target current on account of the counter-induced voltage attendant upon the revolution of the electric motor. Besides, the above description has mentioned the application to the method for controlling the sub steering angle as explained in Embodiment 1, but Embodiment may well be applied to the method for controlling the steered angle as explained in Embodiment 2. In this case, it is allowed to output the steered angle as the transmission characteristic, and to replace the target sub steering angle with the target steered angle, and the detected sub steering angle with the detected steered angle.

As described above, according to Embodiment 5 of this invention, in the state where the steering wheel is being manipulated in the more-turning direction, the vehicular traveling state is corrected on the basis of the deviation between the target drive current and the output of the current detection means, and the transmission characteristic is set using the corrected vehicular traveling state. In addition, the target sub steering angle or the target steered angle is set on the basis of the set transmission characteristic and the steering wheel angle, the target drive current is set on the basis of the deviation between the target sub steering angle and the detected sub steering angle or the deviation between the target steered angle and the detected steered angle, and the current control means controls the current on the basis of the target drive current. Therefore, the uneasy feeling of the driver can be suppressed in the same manner as in Embodiment 3 or 4.

Embodiment 6

Figure 15:
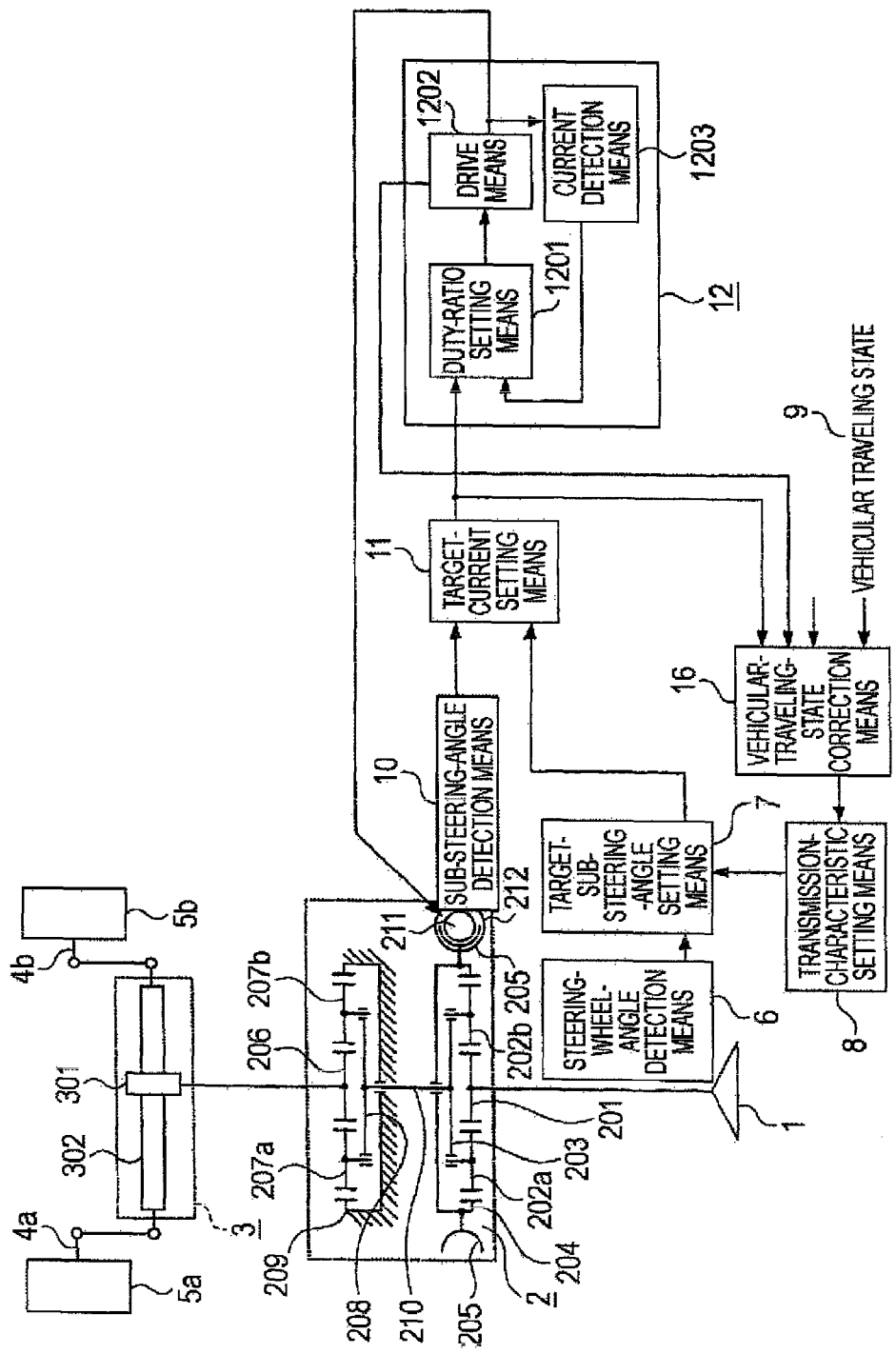
FIG. 15 is a schematic view showing the general configuration of a vehicular steering apparatus according to Embodiment 6 of this invention.

FIG. 15 is a schematic view showing the general configuration of a vehicular steering apparatus in Embodiment 6 of this invention. Embodiment 6 has the configuration of the vehicular-traveling-state correction means 16 modified in comparison with Embodiment 5, and the purpose thereof is the same as that of Embodiment 5.

Now, the apparatus of Embodiment 6 will be described with reference to FIG. 16 and FIGS. 17A and 17B.

FIG. 16 is a block diagram showing the configuration of the vehicular-traveling-state correction means 16. Referring to the figure, the angular velocity $\omega$ of the electric motor 212, the maximum applied voltage $V_B$ which can be applied to the electric motor 212, and a target current $I_{REF}$ are inputted to the vehicular-traveling-state correction means 16. First, the absolute value of the angular velocity $\omega$ is calculated in absolute-value calculation means 1612, and it is multiplied by the counter-induced voltage constant Ke of the electric motor 212 by a multiplier 1613, thereby to calculate a counter-induced voltage $V_E$ which the electric motor 212 is generating.

Subsequently, the difference $V_{MAX}$ between the counter-induced voltage $V_E$ and the maximum applied voltage $V_B$ is calculated by a calculator 1614. When Rm is let denote the total resistance of a current path, which includes the internal resistance of the drive means 1202 and the internal resistance and wiring resistance of the electric motor 212, the difference $V_{MAX}$ is divided by the total resistance Rm by a calculator 1615, thereby to calculate the maximum current $I_{LIM}$ which can be caused to flow through the electric motor 212. That is, a current cannot be caused to flow through the electric motor 212 in excess of the current $I_{LIM}$ calculated here.

Subsequently, the absolute value of the target current $I_{REF}$ outputted from the target-current setting means 11 is calculated in absolute-value calculation means 1601, and the difference between the absolute value of the target current $I_{REF}$ and the maximum current $I_{LIM}$ is calculated by a calculator 1604.

Here, when the result of the calculation of the difference is minus, it is meant that the current can be caused to flow through the electric motor 212 in agreement with the target current $I_{REF}$ by the current control means 12.

On the other hand, when the difference is plus, the current cannot be caused to flow through the electric motor 212 in agreement with the target current $I_{REF}$ by the current control means 12, and the drive control of the sub-steering-angle superposition mechanism 2 cannot be performed in agreement with the target sub steering angle $\theta_{SREF}$. Numeral 1611 designates clip means, and this means 1611 clips the lower limit of the difference between the target current $I_{REF}$ and the maximum current $I_{LIM}$ to zero, thereby to derive a current component which cannot be caused to flow through the electric motor 212. The output of the clip means 1611 becomes equivalent to the difference between the target current $I_{REF}$ and the detected current $I_s$ in Embodiment 5, and the subsequent processing is equivalent to the operation of the apparatus of Embodiment 5.

More specifically, when the current deviation $\Delta I>0$ holds, it is meant that the current is not caused to flow through the electric motor 212 in agreement with the target current, on account of the counter-induced voltage ascribable to the revolution of the electric motor 212, etc. If the control is continued as it is, a large deviation will occur between the target sub steering angle and the actual sub steering angle of the sub-steering-angle superposition mechanism 2. Therefore, the current deviation $\Delta I$ is passed through an LPF 1605 for noise elimination, which has a time constant being, at least, equal to the steering frequency of the driver, and it is thereafter inputted to a gate 1606.

Regarding the opening or closure of the gate 1606, only when more-turning decision means 1607 decides more turning, the output of the LPF 1605 is inputted to and integrated by an integrator 1608. Although the decision of the more turning is not shown in the figure, the output of the steering-wheel-angle detection means 6 is utilized, and a more-turning direction is decided when a steering wheel angle indicates right steering, and besides, a steering-wheel steering speed is in a rightward direction, or when the steering wheel angle indicates left steering, and besides, the steering-wheel steering speed is in a leftward direction. Alternatively, the decision may well be rendered by executing equivalent processing with the output of the sub-steering-angle detection means 10.

The result of the integration by the integrator 1608 is multiplied by a predetermined gain G in a multiplier 1609, thereby to calculate corrected vehicular traveling state Vel. Here, the vehicular traveling state is set as a vehicle speed.

In maximum-value selection means 1610, the corrected vehicular traveling state Vel calculated above is compared with the vehicular traveling state 9, and the state of larger value is outputted to the transmission-characteristic setting means 8. In the transmission-characteristic setting means 8, a transmission characteristic is set in accordance with the inputted vehicular traveling state.

As explained in Embodiment 5, the transmission characteristic of the transmission-characteristic setting means 8 is such that, as shown in FIGS. 2A and 2B, as the vehicle speed heightens, the sub steering angle for the same steering wheel angle narrows. That is, it is meant that, when the transmission characteristic is altered onto the side of higher vehicle speed while the steering wheel is being more turned, a sub steering angle speed is suppressed.

Further, the operation of Embodiment 6 will be described with reference to FIGS. 17A and 17B.

Figure 17A:
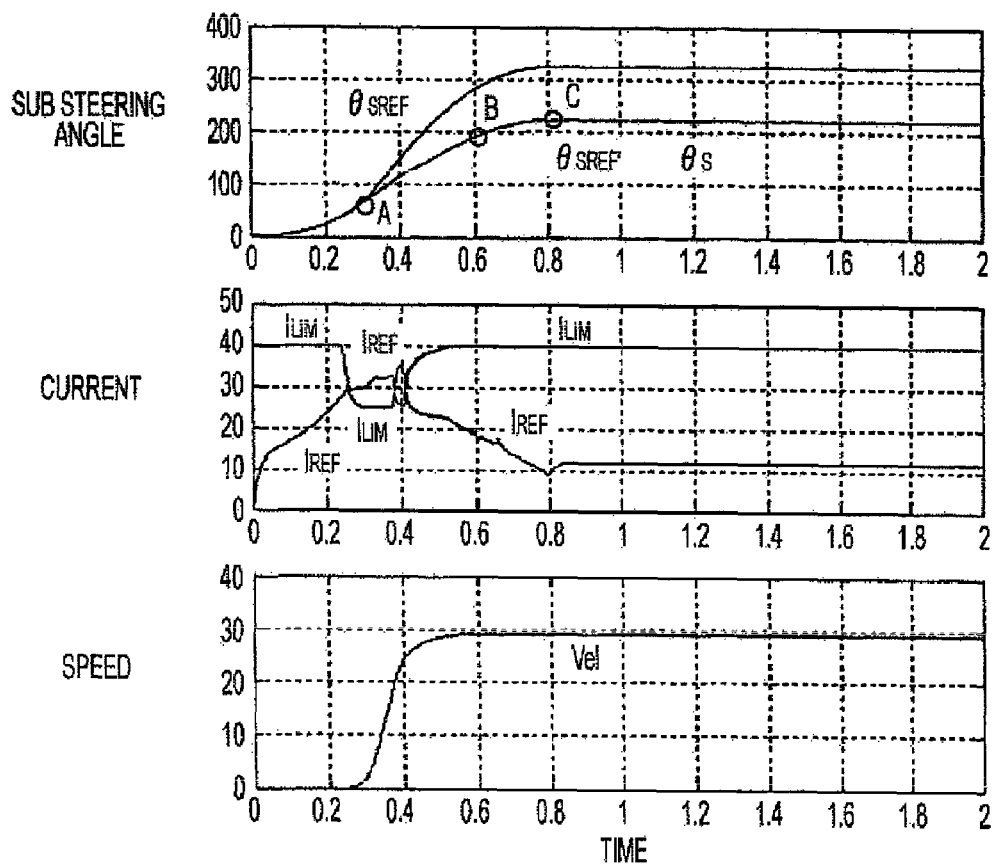
FIGS. 17A and 17B are diagrams for explaining a method for correcting a vehicular traveling state which is used in the setting of a target sub steering angle in Embodiment 6 of this invention.

In FIG. 17A, a target sub steering angle $\theta_{SREF}$ shows a state where Embodiment 6 is not applied, that is, where the vehicular traveling state is not corrected.

On the other hand, a target sub steering angle $\theta_{SREF'}$ shows a state where the vehicular-traveling-state correction means 16 in Embodiment 6 is applied.

More specifically, the target sub steering angle $\theta_{SREF'}$, is a result obtained from the transmission characteristic, which has been obtained by inputting the vehicular state correction value Vel calculated from the current deviation ΔI between the target current $I_{REF}$ and the detected current $I_s$ to the transmission-characteristic setting means 8 as shown in FIG. 16, as the vehicular traveling state (speed), and the steering wheel angle by the target-sub-steering-angle setting means 7.

It is seen from FIG. 17A that, when the current deviation ΔI between the target current $I_{REF}$ and the detected current $I_s$ occurs, the vehicular state correction value Vel enlarges, with the result that the target sub steering angle $\theta_{SREF'}$ is set lower than in the case where the vehicular-traveling-state correction means 16 is not applied. Besides, the sub-steering-angle detection value $\theta_S$ follows up the target sub steering angle $\theta_{SREF'}$.

Figure 17B:
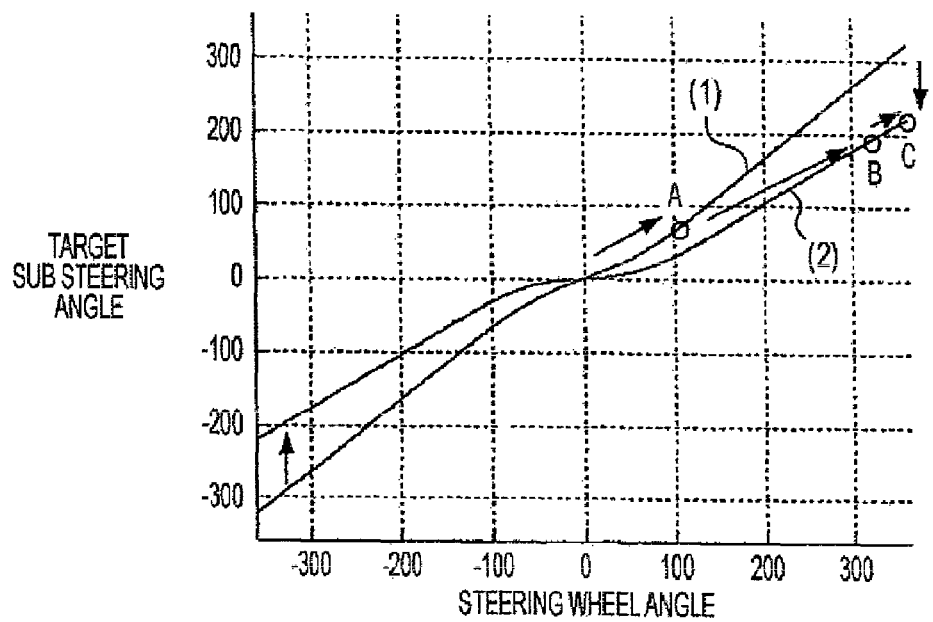

FIG. 17B is a diagram showing the change of a transmission characteristic set by inputting the vehicular state correction value Vel to the transmission-characteristic setting means 8, and the target sub steering angle $\theta_{SREF'}$ set by the target-sub-steering-angle setting means 7. In FIG. 17B, up to a point A, the target sub steering angle $\theta_{SREF'}$ changes in conformity with the motion of the steering wheel angle on an initial transmission characteristic (1). With the change of the vehicular state correction value Vel, the target sub steering angle $\theta_{SREF'}$ changes in conformity with the motion of the steering wheel angle while the transmission characteristic is changing in a direction from (1) to (2). The transmission characteristic becomes the characteristic (2) from a point B at which the vehicular state correction value Vel becomes unchangeable, and the target sub steering angle $\theta_{SREF'}$ changes on the transmission characteristic (2) in conformity with the motion of the steering wheel angle, up to a point C which is the end point of the steering.

Subsequently, when the steering wheel is returned to its middle point, the target sub steering angle $\theta_{SREF'}$ returns to its neutral point because the transmission characteristic is (2).

Since the current deviation ΔI has become zero or after a predetermined time has lapsed, the integral magnitude of the integrator 1608 is changed so that the value of the vehicular state correction value Vel may become zero gradually so as not to offend the driver. Further, when the vehicular traveling state 9 becomes larger than the vehicular traveling state correction magnitude Vel, the vehicular traveling state 9 is inputted to the traveling-characteristic setting means 8 by the maximum-value selection means 1610, and the ordinary state is established. At this time, the integral magnitude of the integrator 1608 is reset to zero.

Incidentally, the above description has mentioned the application to the method for controlling the sub steering angle as explained in Embodiment 1, but Embodiment 6 may well be applied to the method for controlling the steered angle as explained in Embodiment 2. In this case, it is allowed to output the steered angle as the transmission characteristic, and to replace the target sub steering angle with the target steered angle, and the detected sub steering angle with the detected steered angle.

As described above, according to Embodiment 6 of this invention, there are included the means for detecting the revolution speed of the electric motor, and the means for detecting the maximum applied voltage for the electric motor, in the state where the steering wheel is being manipulated in the more-turning direction, whereupon the vehicular traveling state is corrected using the revolution number of the electric motor and the maximum applied voltage, and the transmission characteristic is set using the corrected vehicular traveling state. In addition, the target sub steering angle or the target steered angle is set on the basis of the set transmission characteristic and the steering wheel angle, the target drive current is set on the basis of the deviation between the target sub steering angle and the detected sub steering angle or the deviation between the target steered angle and the detected steered angle, and the current control means controls the current on the basis of the target drive current. Therefore, the uneasy feeling of the driver can be suppressed in the same manner as in Embodiment 5.

Embodiment 7

Figure 18:
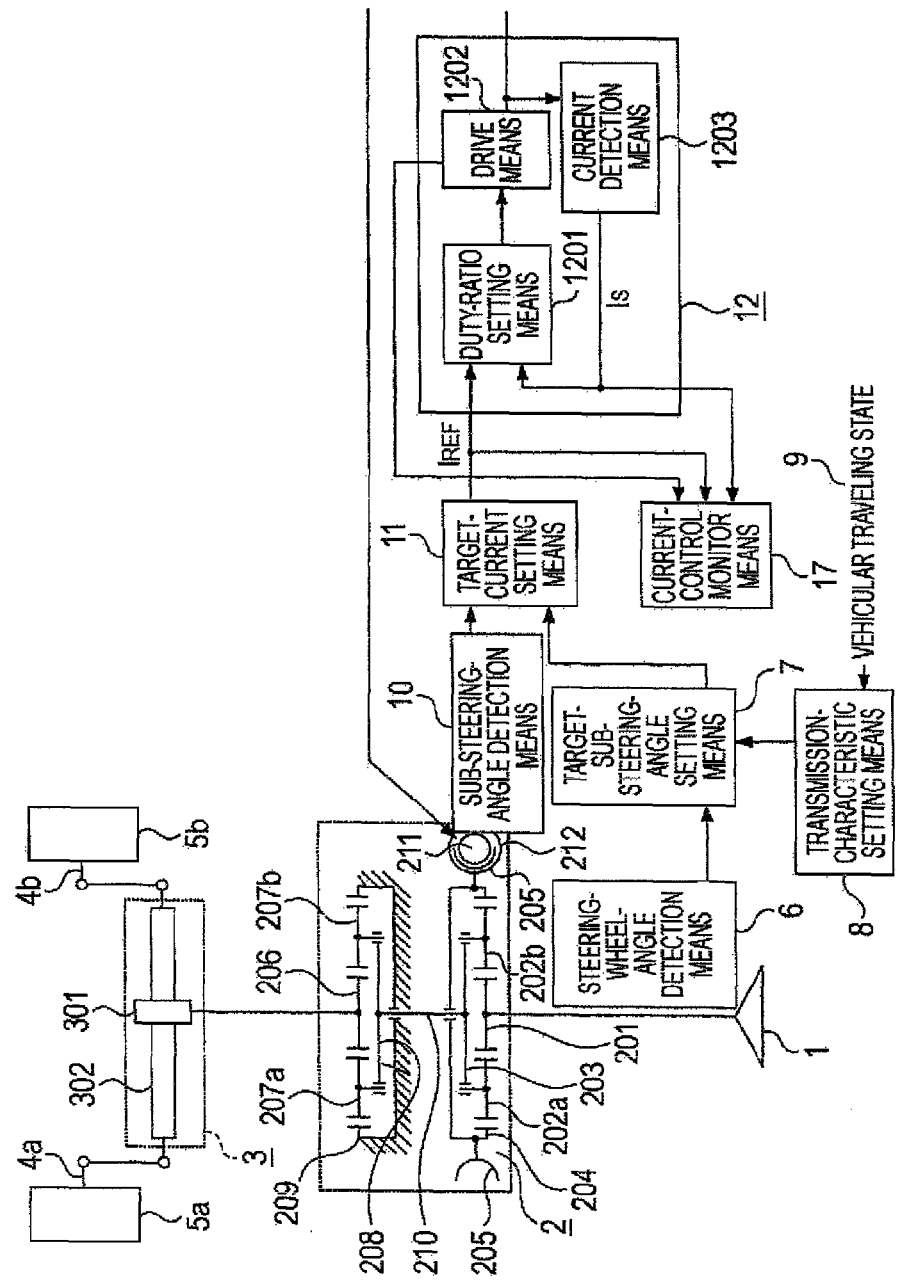
FIG. 18 is a schematic view showing the general configuration of a vehicular steering apparatus according to Embodiment 7 of this invention.

FIG. 18 is a schematic view showing the general configuration of a vehicular steering apparatus in Embodiment 7 of this invention. Embodiment 7 is such that current-control monitor means 17 is added to the apparatus of Embodiment 1. As explained in Embodiment 1, the current control means 12 is configured so as to feed a current to the electric motor 212 in agreement with the target current set by the target-current setting means 11.

Here, when the current fails to be fed to the electric motor 212 in agreement with the target current set by the target-current setting means 11, on account of the fault or the like of the drive means 1202 or the current detection means 1203 included in the current control means 12, the sub steering angle of the sub-steering-angle superposition mechanism 2 cannot be controlled in agreement with the target sub steering angle set by the target-sub-steering-angle setting means 7, and vibrations or the likes occur. Embodiment 7 detects whether or not such current control means 12 is normal.

Now, the operation of the current-control monitor means 17 will be described.

The target current $I_{REF}$ set by the target-current setting means 11, and the detected current $I_s$ detected by the current detection means 1203, basically satisfy the following formula (7) if the current control means 12 is normal, except for a case where the current cannot be caused to flow due to a counter-induced voltage attendant upon the revolution of the electric motor 212:

$$I_{REF} - I_s = 0 \tag{7}$$

Accordingly, $I_{REF} - I_s \neq 0$ holds in a case where the current detection means 1203 cannot detect a proper current, or where it cannot cause an expected current to flow, on account of the fault of the drive means 1202 or the like. Therefore, an abnormality is detected by employing a predetermined threshold value $I_{TH}$ and on the basis of the deviation between the target current $I_{REF}$ and the detected current $I_s$, in conformity with $||I_{REF} - I_s| > I_{TH}$.

However, in order to distinguish the abnormality from the current deviation ascribable to the counter-induced voltage of the electric motor 212 as stated above, the abnormality is not decided in a case where the target current $I_{REF}$ and the detected current $I_s$ are in the same polarity and where $||I_{REF}| > |I_s|$ holds. Besides, the decision of the abnormality should preferably be finally settled in a case where the state of the abnormality decision has continued for a predetermined time period. Here, the threshold value $I_{TH}$ and the predetermined time period are appropriately determined on the basis of behaviors at the time when the apparatus is abnormal.

Further, the operation of other current-control monitor means 17 will be described. Letting $V_E$ denote a counter-induced voltage attendant upon the revolution of the electric motor 212, $V_M$ denote a voltage which is applied to the electric motor 212, $I_M$ denote a current flowing through the electric motor 212, and $R_M$ denote the total impedance of a current path which includes wiring, and the winding of the electric motor 212, the following formula (8) holds among these quantities:

$$I_M \times R_M = V_M - V_E \tag{8}$$

Accordingly, in a case where the current detection means 1203 cannot detect a proper current, or where it cannot cause an expected current to flow, on account of the fault of the drive means 1202 or the like, a computation using the current detection value $I_s$ based on the current detection means 1203 results in $I_s \times R_M \neq V_M - V_E$. By way of example, therefore, an abnormality is detected by employing a predetermined threshold value $I_{TH2}$ and in conformity with $I_s > (V_M - V_E)/R_M + I_{TH2}$ or $I_s < (V_M - V_E)/R_M - I_{TH2}$.

Besides, the decision of the abnormality should preferably be finally settled in a case where the state of the abnormality decision has continued for a predetermined time period. Here, the threshold value $I_{TH2}$ and the predetermined time period are appropriately determined on the basis of behaviors at the time when the apparatus is abnormal. Besides, the voltage $V_M$ which is applied to the electric motor 212 may well be the detected value of a voltage which is actually applied to the electric motor 212, or a target applied voltage which has been calculated by the duty-ratio setting means 1202.

Besides, as explained in Embodiment 1, the counter-induced voltage $V_E$ is calculated from the revolution number $\omega M$ and counter-induced voltage constant Ke of the electric motor 212.

Figure 19:
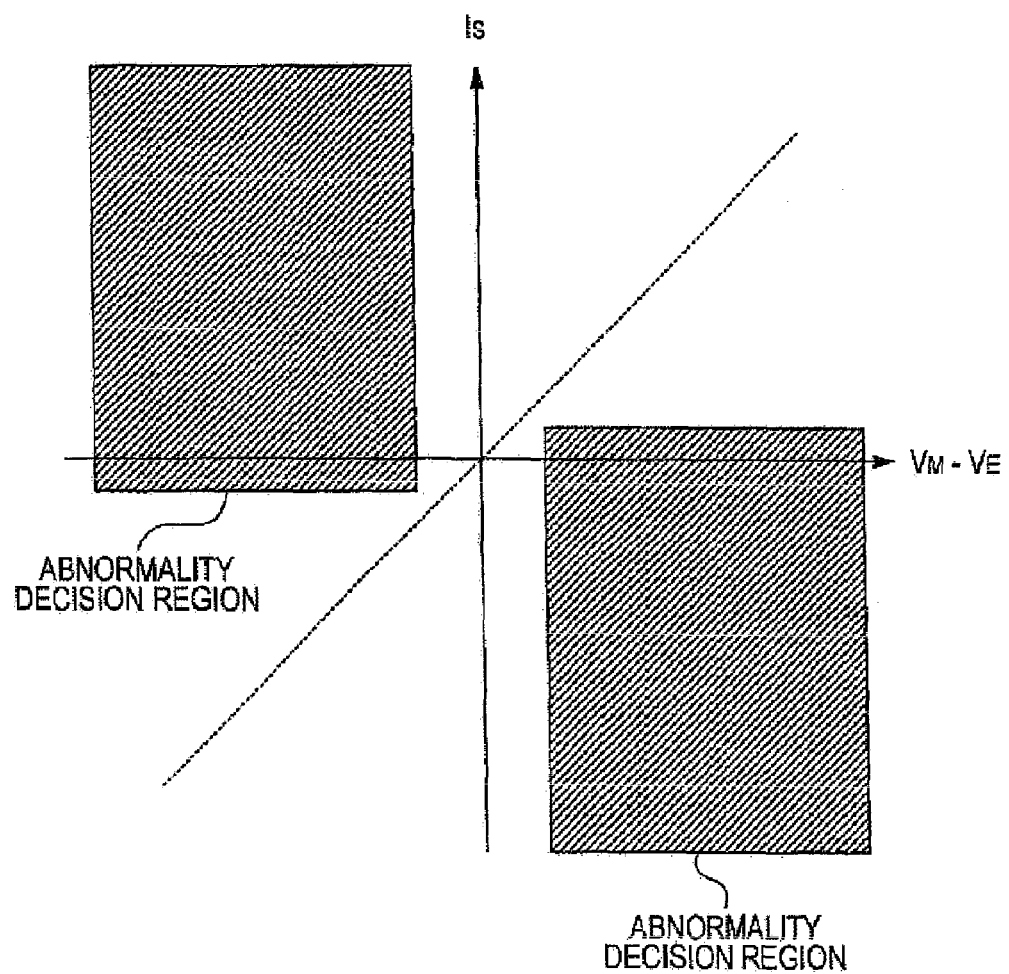
FIG. 19 is a diagram for explaining a method for detecting the fault of current control means in Embodiment 7 of this invention.

By the way, in the above description, one width $I_{TH2}$ centering round $I_M = (V_M - V_E)/R_M$ has been explained as a normal area, but abnormality decision regions may well be designated on a $(V_M - V_E)$-versus-$I_s$ plane as shown in FIG. 19. Also the abnormality decision regions are appropriately determined on the basis of behaviors at the time when the apparatus is abnormal.

As described above, according to Embodiment 7 of this invention, the fault of the current control system can be decided on the basis of the deviation between the target drive current and the detected current of the current detection means.

Alternatively, the drive voltage of the electric motor with the influence of the induced voltage of the electric motor subtracted from the voltage applied to the electric motor is calculated, and the fault of the current control system can be detected from the correlation between this drive voltage and the output of the current detection means.

Various modifications and alterations of this invention will be apparent to those skilled in the art without departing from the scope and spirit of this invention, and it should be understood that this invention is not limited to the illustrative embodiments set forth herein.

What is claimed is:

1. A vehicular steering apparatus having a steering wheel which is manipulated by a driver, and a steering mechanism which steers steered wheels by a sub-steering-angle superposition mechanism controllable by an electric motor; comprising transmission-characteristic setting means for setting a transmission characteristic between a steering angle of the steering wheel and a steered angle of the steered wheels, in accordance with a traveling state of the vehicle, steering-wheel-angle detection means for detecting the steering-wheel steering angle of the driver, sub-steering-angle detection means for detecting a sub steering angle which is steered by the sub-steering-angle superposition mechanism, target sub-steering-angle setting means for generating a target sub steering angle which is to be added by the sub-steering-angle superposition mechanism, on the basis of the output of the steering-wheel-angle detection means and the transmission characteristic set by the transmission-characteristic setting means, and drive control means for driving and controlling the sub-steering-angle superposition mechanism so that the target sub steering angle and the output of the sub-steering-angle detection means may agree;

wherein the drive control means includes:
target-current setting means for setting a target drive current for the electric motor on the basis of an angular deviation between the target sub steering angle and the output of the sub-steering-angle detection means; and
current control means having current detection means for detecting a current which flows through the electric motor, and for controlling the current for the electric motor so that the output of the current detection means may agree with the set current of the target-current setting means.

2. The vehicular steering apparatus as defined in claim 1, wherein the target-current setting means includes, at least, proportional control means for multiplying the deviation between the target sub steering angle and the output of the sub-steering-angle detection means by a predetermined gain, and differential control means for multiplying a differentiated value of the deviation by a predetermined gain, and wherein the target drive current is calculated by outputs of the proportional control means and the differential control means.

3. The vehicular steering apparatus as defined in claim 2, wherein the target-current setting means further includes integral control means for multiplying an integrated value of the deviation between the target sub steering angle and the output of the sub-steering-angle detection means by a predetermined gain, and wherein the target drive current is calculated by the outputs of the proportional control means and the differential control means and an output of the integral control means.

4. The vehicular steering apparatus as defined in claim 1, comprising target-sub-steering-angle correction means for correcting the target sub steering angle on the basis of a deviation between the target drive current and the output of the current detection means.

5. The vehicular steering apparatus as defined in claim 1, comprising target-sub-steering-angle correction means including speed detection means for detecting a revolution speed of the electric motor, and means for detecting a maximum applied voltage for the electric motor; and correcting the target sub steering angle on the basis of the revolution number of the electric motor and the maximum applied voltage.

6. The vehicular steering apparatus as defined in claim 1, comprising vehicular-traveling-state correction means for correcting the traveling state of the vehicle so as to decrease a deviation between the target drive current and the output of the current detection means, in a state where the steering wheel is manipulated in a more-turning direction; wherein the transmission characteristic is set using the vehicular traveling state corrected by the vehicular-traveling-state correction means.

7. The vehicular steering apparatus as defined in claim 1, comprising vehicular-traveling-state correction means including means for detecting a revolution speed of the electric motor, and means for detecting a maximum applied voltage for the electric motor; and correcting the traveling state of the vehicle by using the revolution number of the electric motor and the maximum applied voltage, in a state where the steering wheel is manipulated in a more-turning direction; wherein the transmission characteristic is set using the vehicular traveling state corrected by the vehicular-traveling-state correction means.

8. The vehicular steering apparatus as defined in claim 1, wherein the current control means includes counter-induced-voltage estimation means for estimating a counter-induced voltage attendant upon revolution of the electric motor, and a drive voltage for the electric motor is compensated using the output of the counter-induced-voltage estimation means.

9. The vehicular steering apparatus as defined in claim 1, comprising current-control monitor means for deciding a fault of a current control system on the basis of a deviation between the target drive current and the detected current of the current detection means.

10. The vehicular steering apparatus as defined in claim 1, comprising current-control monitor means for calculating that drive voltage of the electric motor in which influence of a counter-induced voltage of the electric motor has been subtracted from a voltage applied to the electric motor, and for deciding a fault of a current control system on the basis of a correlation between the drive voltage and the output of the current detection means.

11. The vehicular steering apparatus as defined in claim 1, wherein a control cycle of the current control means is shorter than a control cycle of the target-drive-current setting means.

12. A vehicular steering apparatus having a steering wheel which is manipulated by a driver, and a steering mechanism which steers steered wheels by a sub-steering-angle superposition mechanism controllable by an electric motor;
a vehicular steering apparatus comprising transmission-characteristic setting means for setting a transmission characteristic between a steering angle of the steering wheel and a steered angle of the steered wheels, in accordance with a traveling state of the vehicle, steering-wheel-angle detection means for detecting the steering-wheel steering angle of the driver, steered-angle detection means for detecting the steered angle of the steered wheels, target steered-angle setting means for generating a target steered angle which is to be added by the sub-steering-angle superposition mechanism, on the basis of the output of the steering-wheel-angle detection means and the transmission characteristic set by the transmission-characteristic setting means, and drive control means for driving and controlling the sub-steering-angle superposition mechanism so that the target steered angle and the output of the steered-angle detection means may agree;
wherein the drive control means includes:
target-current setting means for setting a target drive current for the electric motor on the basis of an angular deviation between the target steered angle and the output of the steered-angle detection means; and
current control means having current detection means for detecting a current which flows through the electric motor, and for controlling the current for the electric motor so that the output of the current detection means may agree with the set current of the target-current setting means.

13. The vehicular steering apparatus as defined in claim 12, wherein the target-current setting means includes, at least, proportional control means for multiplying the deviation between the target steered angle and the output of the steered-angle detection means by a predetermined gain, and differential control means for multiplying a differentiated value of the deviation by a predetermined gain, and wherein the target drive current is calculated by outputs of the proportional control means and the differential control means.

14. The vehicular steering apparatus as defined in claim 13, wherein the target-current setting means further includes integral control means for multiplying an integrated value of the deviation between the target steered angle and the output of the steered-angle detection means by a predetermined gain, and wherein the target drive current is calculated by the outputs of the proportional control means and the differential control means and an output of the integral control means.

15. The vehicular steering apparatus as defined in claim 12, comprising target-steered-angle correction means for correcting the target steered angle on the basis of a deviation between the target drive current and the output of the current detection means.

16. The vehicular steering apparatus as defined in claim 12, comprising target-steered-angle correction means including speed detection means for detecting a revolution speed of the electric motor, and means for detecting a maximum applied voltage for the electric motor; and correcting the target steered angle on the basis of the revolution number of the electric motor and the maximum applied voltage.

17. The vehicular steering apparatus as defined in claims 12, comprising vehicular-traveling-state correction means for correcting the traveling state of the vehicle so as to decrease a deviation between the target drive current and the output of the current detection means, in a state where the steering wheel is manipulated in a more-turning direction; wherein the transmission characteristic is set using the vehicular traveling state corrected by the vehicular-traveling-state correction means.

18. The vehicular steering apparatus as defined in claims 12, comprising vehicular-traveling-state correction means including means for detecting a revolution speed of the electric motor, and means for detecting a maximum applied voltage for the electric motor; and correcting the traveling state of the vehicle by using the revolution number of the electric motor and the maximum applied voltage, in a state where the steering wheel is manipulated in a more-turning direction; wherein the transmission characteristic is set using the vehicular traveling state corrected by the vehicular-traveling-state correction means.

19. The vehicular steering apparatus as defined in claim 12, wherein the current control means includes counter-induced-voltage estimation means for estimating a counter-induced voltage attendant upon revolution of the electric motor, and a drive voltage for the electric motor is compensated using the output of the counter-induced-voltage estimation means.

20. The vehicular steering apparatus as defined in claim 12, comprising current-control monitor means for deciding a fault of a current control system on the basis of a deviation between the target drive current and the detected current of the current detection means.

21. The vehicular steering apparatus as defined in claim 12, comprising current-control monitor means for calculating that drive voltage of the electric motor in which influence of a counter-induced voltage of the electric motor has been subtracted from a voltage applied to the electric motor, and for deciding a fault of a current control system on the basis of a correlation between the drive voltage and the output of the current detection means.

22. The vehicular steering apparatus as defined in claim 12, wherein a control cycle of the current control means is shorter than a control cycle of the target-drive-current setting means.

* * * * *